(12) United States Patent
Caraccio et al.

(10) Patent No.: US 9,880,772 B2
(45) Date of Patent: Jan. 30, 2018

(54) SYSTEMS AND METHODS FOR PROVIDING FILE INFORMATION IN A MEMORY SYSTEM PROTOCOL

(71) Applicant: Micron Technology, Inc., Boise, ID (US)

(72) Inventors: Danilo Caraccio, Buonalbergo (IT); Graziano Mirichigni, Vimercate (IT); Gianfranco Santopietro, Maratea (IT); Gianfranco Ferrante, San Giorgio a Cremano (IT); Emanuele Confalonieri, Lesmo (IT)

(73) Assignee: Micron Technology, Inc., Boise, ID (US)

( * ) Notice: Subject to any disclaimer, the term of this patent is extended or adjusted under 35 U.S.C. 154(b) by 11 days.

(21) Appl. No.: 14/860,326

(22) Filed: Sep. 21, 2015

(65) Prior Publication Data

US 2017/0083260 A1 Mar. 23, 2017

(51) Int. Cl.
*G06F 3/06* (2006.01)

(52) U.S. Cl.
CPC .......... *G06F 3/0643* (2013.01); *G06F 3/061* (2013.01); *G06F 3/0679* (2013.01)

(58) Field of Classification Search
CPC ....... G06F 3/061; G06F 3/0643; G06F 3/0679
See application file for complete search history.

(56) References Cited

U.S. PATENT DOCUMENTS

| 2013/0326141 A1* | 12/2013 | Marcu | G06F 13/385 |
| | | | 711/115 |
| 2014/0281172 A1 | 9/2014 | Seo et al. | |
| 2014/0325168 A1* | 10/2014 | Yun | G06F 3/06 |
| | | | 711/159 |
| 2014/0365719 A1 | 12/2014 | Kuzmin et al. | |
| 2015/0103596 A1 | 4/2015 | Dor et al. | |
| 2015/0199137 A1* | 7/2015 | Shin | G06F 3/0611 |
| | | | 711/103 |
| 2015/0212738 A1* | 7/2015 | D'Eliseo | G06F 3/0604 |
| | | | 711/154 |
| 2015/0234601 A1* | 8/2015 | Tsai | G06F 3/0611 |
| | | | 711/103 |
| 2015/0331628 A1* | 11/2015 | Lee | G06F 3/0619 |
| | | | 711/103 |

OTHER PUBLICATIONS

Embedded Multi-Media Card (e•MMC) Electrical Standard (5.1), JEDEC Standard, Feb. 2015, JESD84-B51, JEDEC Solid State Technology Association.
PCT International Search Report & Written Opinion; PCT Application No. PCT/US2016/052864; dated Dec. 30, 2016.

* cited by examiner

*Primary Examiner* — Aracelis Ruiz
(74) *Attorney, Agent, or Firm* — Fletcher Yoder, P.C.

(57) ABSTRACT

A memory device includes a memory component and controller circuitry. The memory component stores data and the controller circuitry receives, from a host electronic device, one or more commands of a memory system protocol. The one or more commands include at least one write command, the write command comprising one or more blocks of data to be stored in the memory component. Further, the one or more commands include metadata, attributes, or both related to the one or more blocks of data. The controller circuitry interprets and executes the one or more commands. Accordingly, the blocks are stored in the memory component. Further, the controller circuitry of the memory device has access to the metadata, attributes or both.

27 Claims, 14 Drawing Sheets

SYSTEMS AND METHODS FOR PROVIDING FILE INFORMATION IN A MEMORY SYSTEM PROTOCOL

BACKGROUND

1. Field of the Invention

The present disclosure is generally related to performing data operations (e.g., read, write) using memory devices. More specifically, the present disclosure is related to providing file metadata and/or attributes from a host file system during data operations of the protocol, thus enabling a number of new metadata and/or attribute-based functionalities, which may improve system level performance and/or reliability.

2. Description of the Related Art

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Conventional protocols generally transmit data between a host and memory devices with relatively little contextual information about the transmitted data. Accordingly, a controller of the memory devices (e.g., the flash translation layer) stores the data without regard to contextual information (e.g., metadata and/or attributes) of the data. For example, in traditional data placement techniques, contextual information, such as file identifiers and/or metadata flags are not available to the controller of the memory devices. Thus, this contextual data is not available for use in file placement. Therefore, these traditional data placement techniques result in unnecessary fragmented placement of data that is not based on contextual information of the data. Such fragmentation may lead to less efficient data storage and/or access.

BRIEF DESCRIPTION OF THE DRAWINGS

Various aspects of this disclosure may better be understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Overview

As will be discussed in detail below, the present disclosure generally relates to providing contextual file system data (e.g., metadata and/or attributes) related to transferred data blocks, via a memory system protocol, to memory devices of the protocol that store the data blocks. That is, a host device that provides data blocks via the memory system protocol may adjust certain operations to provide certain contextual information about the provided data to a memory device receiving the data via the memory system protocol.

Figure 1:
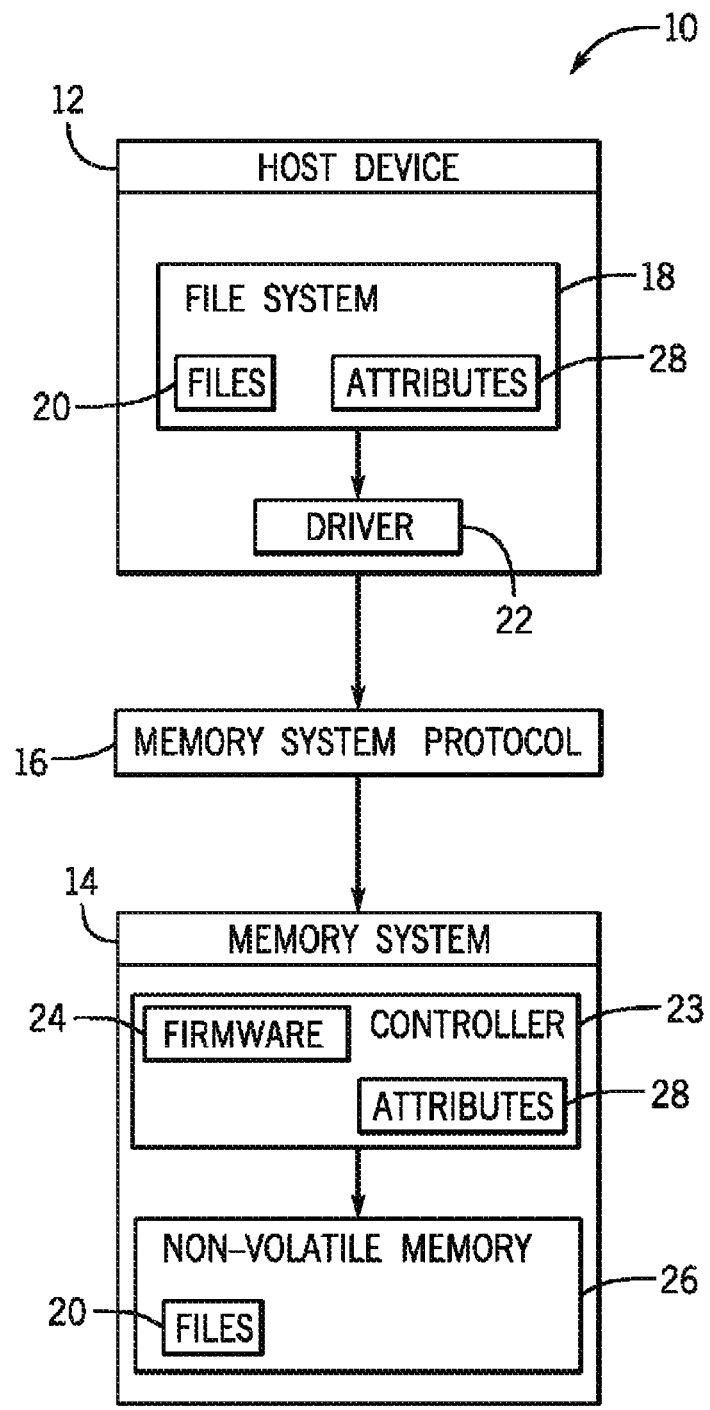
FIG. 1 illustrates a block diagram of an example of a computing system, in accordance with an embodiment.

FIG. 1 illustrates a system 10 that provides data from a host 12 to a non-volatile managed memory system 14 according to a memory system protocol 16 (e.g., an embedded multimedia card (eMMC) protocol) via a memory system protocol bus. In one embodiment, the memory system protocol 16 may be a packet-based protocol that enables an efficient (e.g., power efficient, bit efficient) transmittal of packets of data between memory devices, computing devices, and the like. The protocol 16 may be implemented in a number of combinations with various types of memory and processors such as Automata processors, a Processor-in-Memory, network devices, storage appliances, hierarchical memory, abstracted memory, and the like. As used herein, processors may include any suitable processor capable of performing executable instructions on a corresponding electrical device. The protocol 16 may also facilitate a broad range of devices including data center switches/routers, network routers, mobile devices, storage devices, Automata processors, Stream processors, processor-in-memory, work-moving-processors, Big Data, Big Graph, secure memory, virtual network, general abstracted memory (e.g., Dynamic Random-Access Memory (DRAM), NAND, and emerging memories), and the like.

From time to time, the host device 12 may desire to transfer (e.g., write) data from the file system 18 to the non-volatile managed memory system 14. For example, one or more files 20 may be transferred to the non-volatile managed memory system 14 by providing one or more commands from a driver 22 of the host device 12. The commands may conform to specific commands described by the memory system protocol 16. In other words, the driver 22 may provide data in accordance with the memory system protocol 16.

The commands provided in accordance with the memory system protocol 16, from the driver 22, may be received at the controller 23 of the non-volatile managed memory system 14. As may be appreciated, the controller 23 may include circuitry that can receive and interpret commands that are described by the memory system protocol 16, in accordance with firmware 24 of the controller 23. In other words, the controller 23 may receive and process data in accordance with the memory system protocol 16. Upon receiving data from the host device 12, the controller 23 may transfer the files 20 to non-volatile memory 26 of the non-volatile managed memory system 14.

As illustrated in the current embodiment, the host device 12 may provide one or more file attributes 28 (e.g., contextual data and/or metadata related to the files 20) to the non-volatile managed memory system 14. For example, as described in more detail below, the driver 22 may provide commands in accordance with the memory system protocol 16 that result in provision of the attributes 28 to the controller 23 of the non-volatile managed memory system 14. Accordingly, the controller 23 may utilize the attributes 28 in processing functions of the files 20. For example, as will be discussed in more detail with regard to FIGS. 2 and 3, in some embodiments, the attributes 28 may include a file identifier of transferred data blocks, which the controller 23 may use to place the data blocks (e.g., portions of the files 20) in a more cohesive, less fragmented manner.

Figure 2:
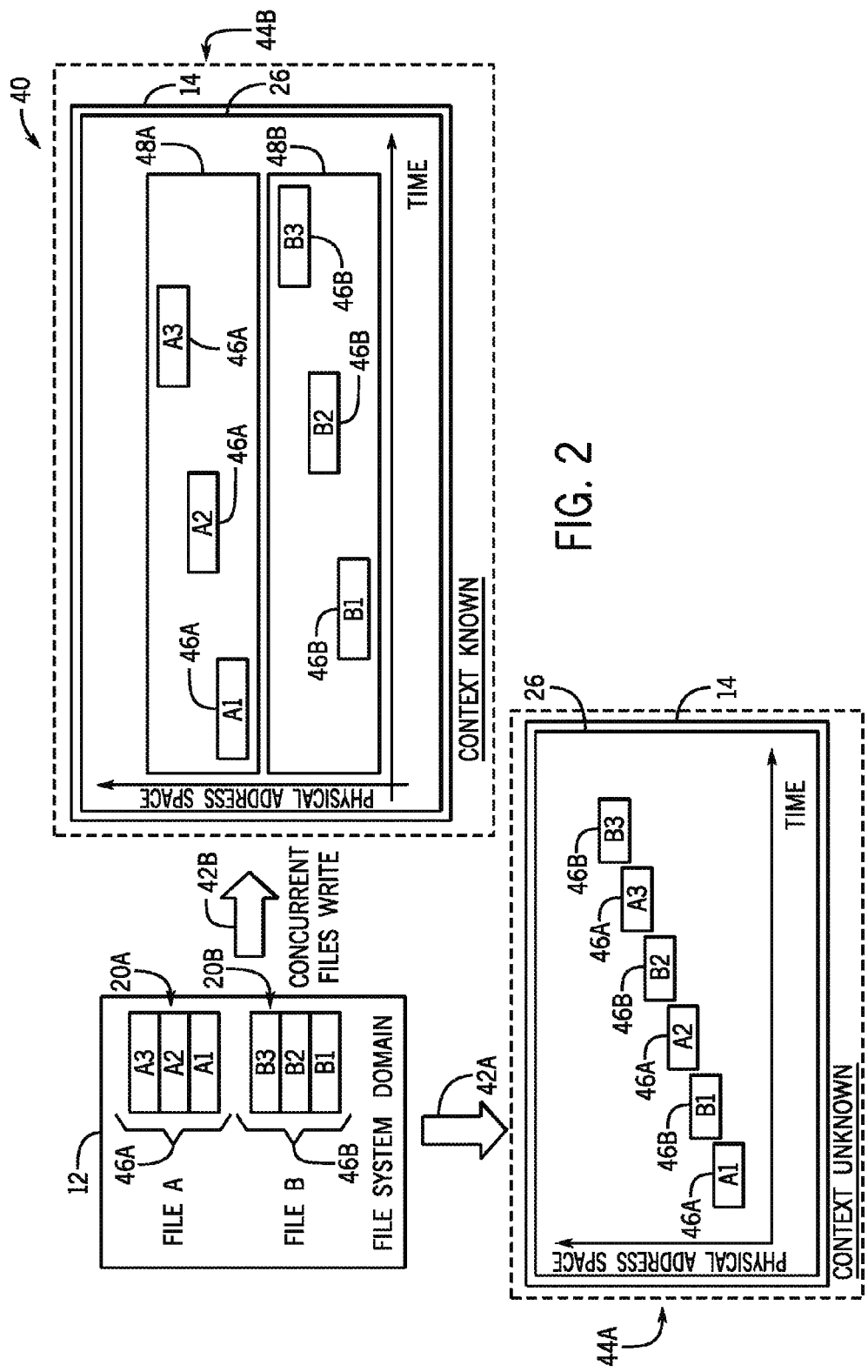
FIG. 2 illustrates a block diagram of an example of metadata-based file placement functionalities implemented using a memory system protocol, in accordance with an embodiment.

Using the techniques provided herein, the controller 23 may become aware of additional information regarding received data blocks. For example, the data blocks may be associated with particular file identifiers that enable the controller 23 to implement additional context-based functionalities. FIG. 2 illustrates a block diagram 40 contrasting context-based file placement functionalities implemented using attributes 28 provided by the host device 12 using memory system protocol commands with traditional file placement functionalities that do not use attributes 28.

In circumstances where the host device 12 provides concurrent data block writes (e.g., provides simultaneous write commands for two different data blocks of two different files 20A and 20B), it may be useful to have information regarding file identities associated with the data blocks, during the write operations. To illustrate the benefit of such contextual data, placement results 44A of traditional concurrent file writes 42A are provided to illustrate a comparison with concurrent file writes 42B where file identifiers are known by the controller (e.g., controller 23 of FIG. 1).

As illustrated, files 20A and 20B may be separated, by the host device 12, into data blocks 46A and 46B, respectively. The data blocks 46A and 46B may allow for smaller portions of the files 20 to be provided from the host device 12 to the non-volatile managed memory system 14. When the data blocks 46A and 46B of the files 20A and 20B are concurrently provided to the non-volatile managed memory system 14 via traditional techniques where the controller is unaware of contextual data (e.g., file attributes/metadata, such as a file identifier and/or metadata flag), the placement of the blocks 46A and 46B may be interleaved, causing fragmentation of the overall files 20A and 20B. For example, as illustrated in the results 44A, blocks 46A are interleaved with blocks 46B because some of the blocks 46A and 46B are received in an interleaved fashion over time. Thus, these blocks 46A and 46B are placed in an interleaved fashion at the non-volatile managed memory system 14.

In contrast, as illustrated by the results 44B, when the controller is aware of contextual data, such as file identities associated with the blocks 46A and 46B, the controller may place the blocks 46A and 46B in different portions (e.g., portions 48A and 48B) of the memory 26 based upon the file identity associated with each of the blocks 46A and 46B. For example, as illustrated, each of the blocks 46A are placed in portion 48A and each of the blocks 46B are placed in portion 48B, despite the interleaved reception of the blocks 46A and 46B over time.

Figure 3:
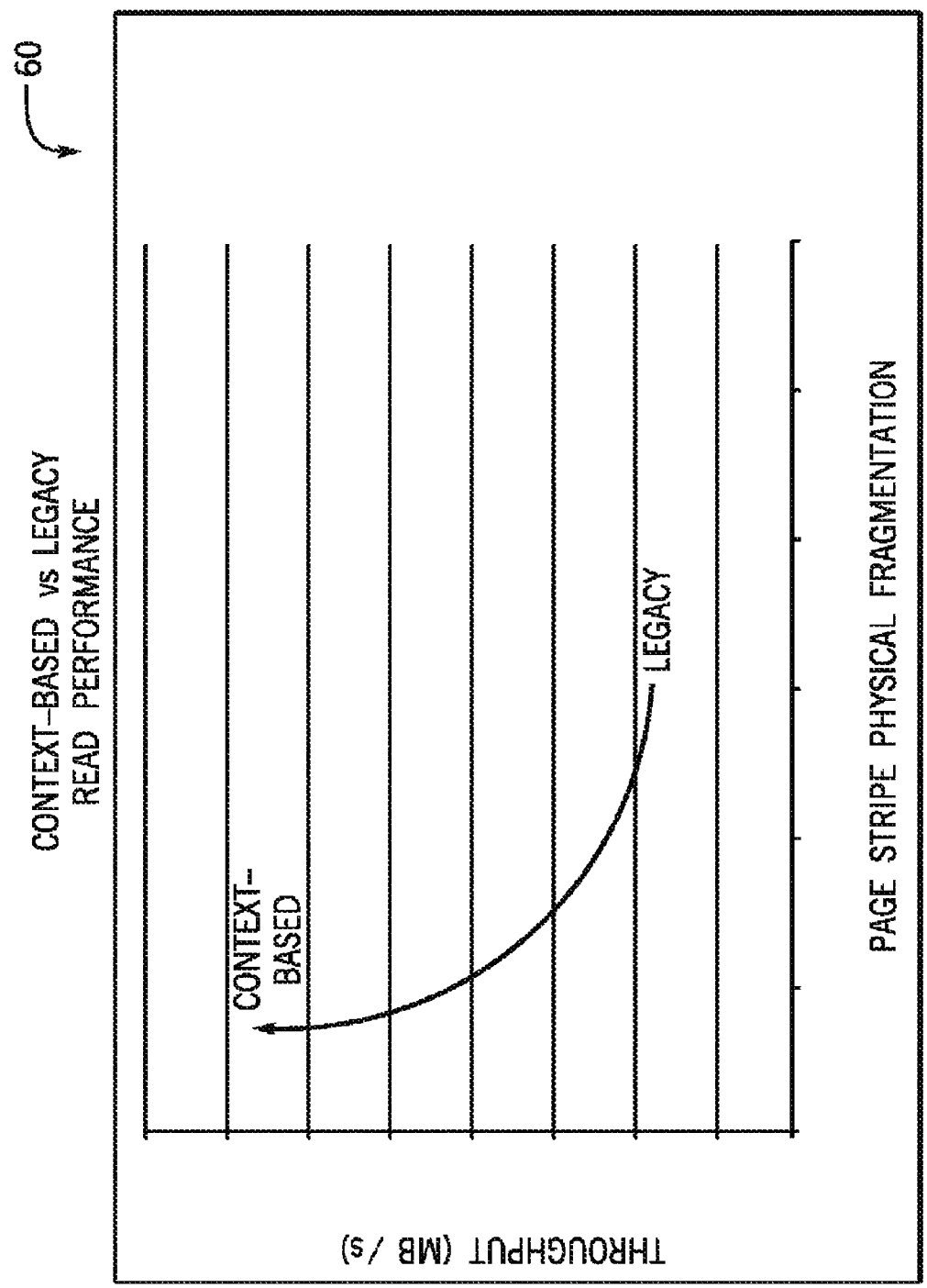
FIG. 3 illustrates performance improvements of the metadata-based file placement functionalities of FIG. 2 contrasted with traditional file placement techniques.

FIG. 3 is a plot diagram 60 illustrating performance improvements of the context-based file placement functionalities of FIG. 2. Fragmentation may have a profound impact on read performance of the non-volatile managed memory system 14. As illustrated by the plots 62 in FIG. 3, files written under a legacy approach where the controller is unaware of file identity, result in increased fragmentation. The fragmentation correlates with lower throughput for read operations.

However, as illustrated by the plots 64, when using the techniques described herein, where blocks are placed according to file identifiers that the controller is aware of, fragmentation is greatly reduced. Such data placement may be referred to as File Aware Memory System (FAMS). The reduced fragmentation of FAMS may result in less data fragmentation and higher data throughput for read operations.

Implementation in Accordance with Memory System Protocols

The following embodiments illustrate techniques for providing contextual data (e.g., file attributes/metadata) associated with data blocks transferred to a memory device during a write operation. The contextual data may be provided via messages that correspond to a memory system protocol. For example, the following description relates to commands/data that may be provided between the host device (e.g., host device 12 of FIG. 1) and a non-volatile memory device (e.g., non-volatile managed memory system 14 of FIG. 1), where the host device 12 and the non-volatile managed memory system 14 communicate in accordance with an embedded multimedia card (eMMC) protocol. The communications include one or more attributes and/or metadata corresponding to data written to the managed memory system 14 from a file system of the host device 12. The eMMC protocol includes communications where commands may be queued and/or communications where single commands are provided between the host 12 and the managed memory system 14. The discussion below includes command queuing and single command embodiments for transmitting contextual data to the managed memory system 14.

As may be appreciated, in the following discussion, varied amounts of data may be transmitted from the host device 12 to the managed memory system 14. The threshold amount of data may be defined according to a particular file system 18, particular attributes 28 that are provided from the file system 18 to the controller 23, the firmware 24, or other characteristics of the system 10. For example, in the current embodiments, 8 bytes or 16 bytes of data may be used to describe a file identifier. Further, while the embodiments below describe a file identifier and metadata flag being passed as metadata and/or attributes 28, in alternative embodiments, additional and/or alternative metadata and/or attributes 28 may be provided in a similar fashion to the provision of the file identifier and metadata flag. Further, as discussed below, in the following embodiments, the metadata and/or attributes 28 may be provided using existing commands of the memory system protocol 16, minimizing additional commands, operations, and/or register changes, which may provide for a more robust and re-usable system 10.

To implement metadata and/or attribute provision to the memory device's controller 23 using write command operations of the protocol 16, it may be useful to provide an indication that a particular write operation providing the metadata and/or attribute 28 to the managed memory system 14 is a metadata and/or attribute-based operation. Such an indication may help the controller 23 distinguish between commands intended to convey data blocks and commands intended to convey metadata and/or attributes 28 along with the data blocks. As mentioned above, in the following embodiments a file identifier and a metadata flag are provided to the controller 23. These metadata and/or attributes 28 are provided to implement file-based writes as discussed in FIGS. 2 and 3. Accordingly, the indication of commands intended to convey contextual information (e.g., metadata and/or attributes 28) may be referred to as a "file-based access" indication in the following embodiments. Further, the metadata and/or attributes 28 may be referred to as a "file identifier" and/or "metadata flag", as these are the metadata and/or attributes 28 being provided in the following embodiments.

i. Command Queuing Embodiments

Turning now to particular embodiments for providing attributes and/or metadata using command queuing techniques, FIGS. 4-15 illustrate particular command queuing embodiments and processes that utilize commands of the memory system protocol 16 to provide certain contextual data (e.g., metadata and/or attributes 28) corresponding to data blocks provided from the host device 12 to the managed memory system 14. In the following embodiments, the metadata and/or attributes 28 include a file identifier and a metadata flag. However, the metadata and/or attributes 28 are not limited to such data.

a. Embodiments where Attributes are Transmitted at Execution Phase

FIGS. 4-7 illustrate embodiments where an unused bit or special context identifier are used to indicate file-based access. In these embodiments, the attributes are transferred at the beginning of the execution phase. As described herein, in some instances, alternative embodiments where the attributes are provided during the queuing phase may be more desirable, as the attributes are available prior to task execution.

1. Unused Bits Indicating File-Based Access

Figure 4:
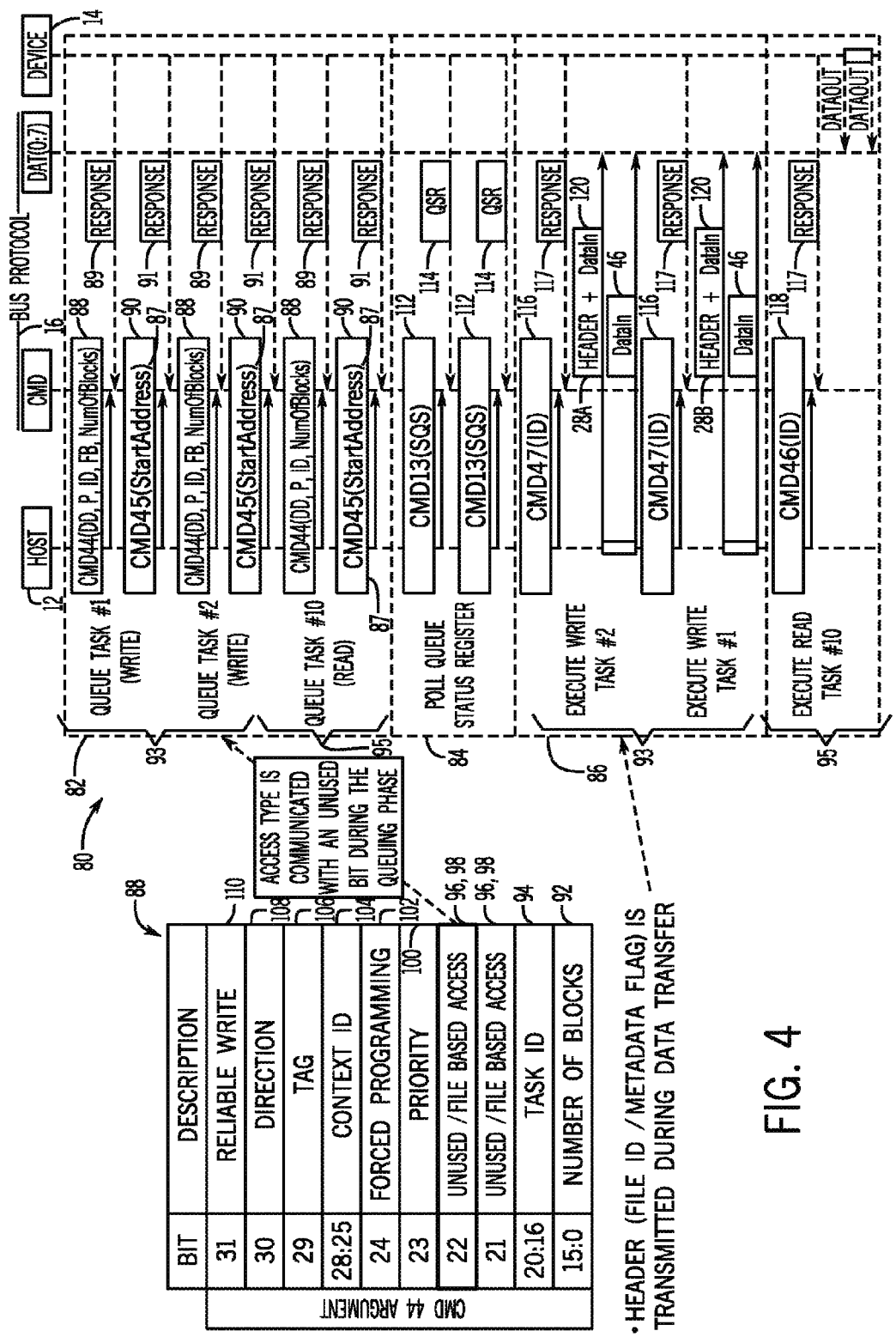
FIG. 4 illustrates a detailed packet level transmission for providing file metadata, using a file-based access request bit in a command of the memory system protocol, in accordance with an embodiment.

Starting first with FIG. 4, FIG. 4 illustrates a detailed packet level transmission 80 for providing file metadata, using a file-based access request bit in a command of the memory system protocol, in accordance with an embodiment. As illustrated in FIG. 4, command queuing transactions include three phases, a queuing phase 82, a polling phase 84, and an execution phase 86. In the queuing phase 82, the host device 12 queues created tasks for execution at the managed memory system 14. In the polling phase 84, the host device 12 may provide a polling inquiry to determine whether the queued tasks are ready for execution at the managed memory system 14. When the queued tasks are ready for execution, the execution phase 86 commences, resulting in execution of the ready queued tasks.

The queuing phase 82 includes CMD44 commands 88 and CMD45 commands 90 that are specified in the protocol 16. These commands are provided by the host 12 to queue data block write tasks 93 and/or read tasks 95.

To queue tasks 93 and/or 95, the CMD44 commands 88 are provided from the host 12 to the managed memory system 14. Upon receiving the CMD44 commands 88, the managed memory system 14 provides an acknowledgment response 89 to the host 12. In response, the host 12 provides a CMD45 command 90. The CMD45 commands 90 may be used to indicate the start address 87 of a read and/or write operation associated with the tasks 95 and/or 93 in command queuing mode. Upon reception at the device 14, the device 14 provides a subsequent response 91.

As illustrated, during the queuing phase 82, the CMD44 commands 88 may include 32 bits of data that represent particular items designated by the protocol 16. As illustrated, bits 0-15 may specify a number of blocks 92, bits 16-20 may specify a Task ID 94, bits 21 and/or 22 may be unused 96 (e.g., reserved for future use) and/or may communicate a particular access type 98, bit 23 may indicate a priority 100, bit 24 may provide a forced programming indication 102, bits 25-28 may indicated a context ID 104, bit 29 may provide a tag indication 106, bit 30 may indicate direction 108, and/or bit 31 may indicate a reliable write 110.

In the current embodiment, the file-based access indicator 98 is conveyed in the CMD44 commands 88 associated with write tasks 93, using an unused bit (e.g., bit 21 or bit 22). Accordingly, the access type is communicated during the queuing phase 82. From time to time, unused bits (e.g., bit 21 or bit 22) may be redefined as a bit used by the protocol 16. Accordingly, in embodiments using a currently unused bit (as defined by the protocol 16), the bit used to convey the file-based access indicator 98 may occasionally be redefined. For example, if, in a subsequent definition of the protocol 16, bit 22 is defined for use of a different functionality, the indicator 98 may be conveyed using bit 21 (or other subsequent unused bit).

Eventually, the host 12 may schedule a polling inquiry (e.g., the polling phase 84). For example, a series of CMD13 commands 112 may be provided by the host 12 to the device 14, to determine if the device is ready to begin the execution phase 86. The device 14 responds with queue status information 114. The host 12 can then decide whether queued tasks are ready for execution.

Once an indication is received that the device 14 is ready for task execution, the host 12 may initiate the execution phase 86. The host 12 may provide one or more CMD47 commands 116 and/or CMD46 commands 118 associated with the queued tasks 93 and/or 95.

In response, the device 14 may provide a response to the host 12. Subsequently, when the host 12 provides data writes (e.g., using CMD47 commands 116), data blocks 46 and headers 120 may be provided by the host 12 to the device 14. The header 120 of the write operation may include the metadata and/or attributes 28 associated with the data blocks 46 provided by the CMD47 commands. For example, the header may include a file identifier and/or metadata flag. Because the file-based access indicator 98 indicates a file-based access indication, the device 14 may interpret that the header information includes the metadata and/or attributes 28.

Because the metadata and/or attributes 28 are transmitted during the actual data transfer (e.g., in the header of the data transfer), the device 14 may not be able to utilize all functionalities that may be available if the metadata and/or attributes 28 were provided prior data transfer. For example, in some scenarios, it may be more difficult to place data blocks based upon the metadata, when the metadata is not known until during the data transfer initiation. Accordingly, certain embodiments below discuss possibilities for providing the metadata prior to data transfer.

Figure 5:
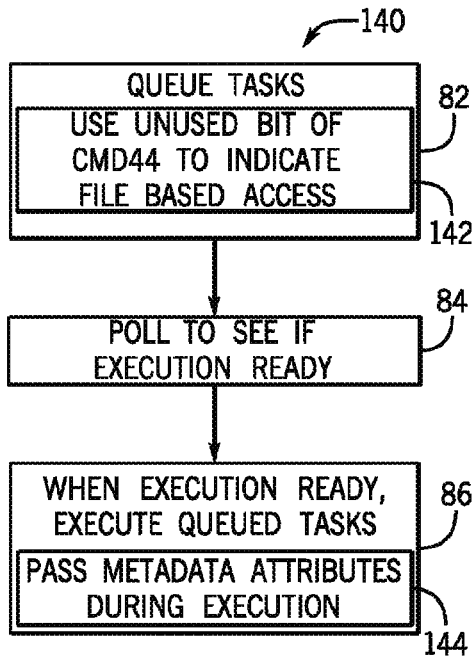
FIG. 5 illustrates a flowchart for the detailed packet level transmission of FIG. 4, in accordance with an embodiment.

FIG. 5 illustrates a process 140 for providing metadata and/or attributes 28 using an unused bit of a CMD44 command 88, in accordance with an embodiment. As mentioned above, one or more tasks (e.g. read and/or writes) may be queued by the queuing phase 82. The queued commands may include an indicator 98 in unused bits of the command (block 142). For example, in FIG. 4, the write tasks 93 include the indicator 98 in bit 22, which is a currently unused bit in the protocol definition.

Next, the polling phase 84 is initiated to determine which and how many of the tasks 93 and/or 95 are ready for implementation. For example, the device 14 may provide queue status information 114 that enables the host 12 to determine the tasks 93 and/or 95 that are ready for implementation.

When the device 14 is ready for the execution of particular tasks 93 and/or 95, the execution phase 86 begins. The tasks 93 and/or 95 are executed from the host 12 to the device 14. As indicated in FIG. 5, the metadata and/or attributes 28 are provided in headers during the data transfer (block 144). Accordingly, the metadata and/or attributes 28 are provided during the execution phase. In some embodiments, this may limit certain functionalities of the device 114, however, in other embodiments, metadata and/or attributes 28 provided during the execution phase may also be useful.

2. Special Context Identifier Indicating File-Based Access

Figure 6:
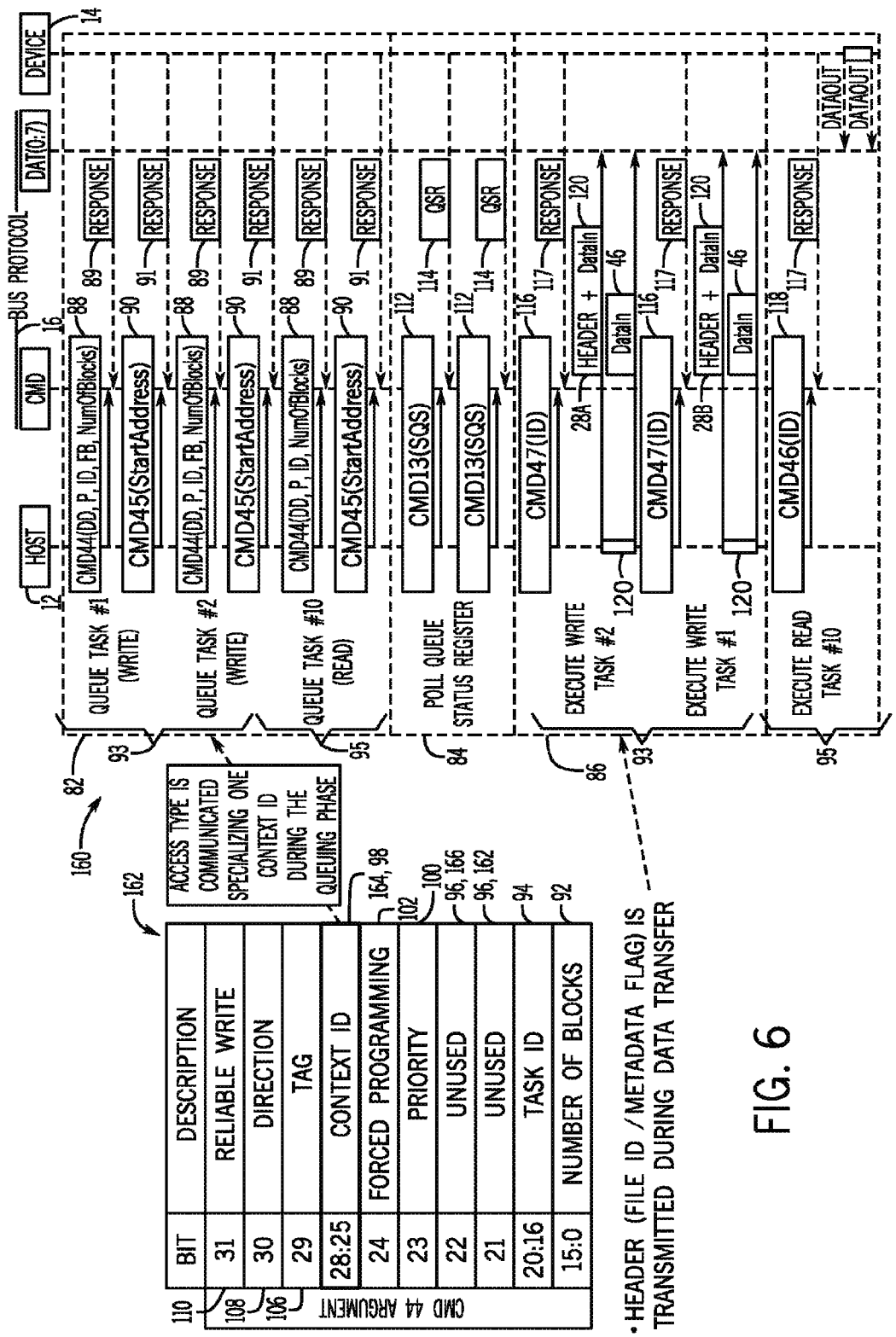
FIG. 6 illustrates a detailed packet level transmission for providing file metadata, using a specialized context identifier in a command of the memory system protocol, in accordance with an embodiment.

Alternative embodiments may use other portions of the protocol commands to indicate metadata and/or attribute 28 provision operations. FIG. 6 illustrates a detailed packet level transmission 160 for providing file metadata, using a specialized context identifier in a command of the memory system protocol 16, in accordance with an embodiment.

Similar to the embodiment of FIG. 4, FIG. 6 illustrates command queuing transactions that include three phases: a queuing phase 82, a polling phase 84, and an execution phase 86. The queuing phase 82 includes CMD44 protocol 16 commands 88 and CMD45 protocol 16 commands 90 that are provided by the host 12 to queue data block write tasks 93 and/or read tasks 95.

To queue tasks 93 and/or 95, the CMD44 commands 88 are provided from the host 12 to the managed memory system 14. Upon receiving the CMD44 commands 88, the managed memory system 14 provides an acknowledgment response 89 to the host 12. In response, the host 12 provides a CMD45 command 90. The CMD45 commands 90 may be used to indicate a start address 87 of the queued read and/or write operations associated with the tasks 93 and/or 95 in command queuing mode. Upon reception at the device 14, the device 14 provides a subsequent response 91.

Similar to the embodiment of FIG. 4, during the queuing phase 82, the CMD44 commands 88 may include 32 bits of data that represent particular items designated by the protocol 16. As illustrated, bits 0-15 may specify a number of blocks 92, bits 16-20 may specify a Task ID 94, bits 21 and/or 22 may be unused 96 (e.g., reserved for future use), bit 23 may indicate a priority 100, bit 24 may provide a forced programming indication 102, bits 25-28 may indicated a context ID 164, bit 29 may provide a tag indication 106, bit 30 may indicate direction, and/or bit 31 may indicate a reliable write.

In the current embodiment, the file-based access indicator 98 is conveyed by specifying a specialized context identifier 164 in bits 25 through 28 of the CMD44 commands 88 associated with write tasks 93. Accordingly, the access type is communicated during the queuing phase 82.

Eventually, the host 12 may schedule a polling inquiry (e.g., the polling phase 84). For example, a series of CMD13 commands 112 may be provided by the host 12 to the device 14, to determine if the device is ready to begin the execution phase 86. The device 14 responds with queue status information 114. The host 12 can then decide whether queued tasks are ready for execution.

Once an indication is received that the device 14 is ready for task execution, the host 12 may initiate the execution phase 86. The host 12 may provide one or more CMD47 commands 116 and/or CMD46 commands 118. In response, the device 14 may provide a response to the host 12. Subsequently, when the host 12 provides data writes (e.g., using CMD47 commands 116), data blocks 46 and headers 120 may be provided by the host 12 to the device 14. The headers 120 of the write operation may include the metadata and/or attributes 28 (or portions 28A and/or 28B of the metadata and/or attributes 28) associated with the data blocks provided by the CMD47 commands. For example, the header may include a file identifier and/or metadata flag. Because the specialized context identifier indicates a file-based access indication, the device 14 may interpret that the header information includes the metadata and/or attributes 28.

Similar to the embodiments of FIG. 4, because the metadata and/or attributes 28 are transmitted during the actual data transfer (e.g., in the header of the data transfer), the device 14 may not be able to utilize all functionalities that may be available if the metadata and/or attributes 28 were provided prior to data transfer. For example, it may be more difficult to place data blocks based upon the metadata and/or attributes 28, when the metadata and/or attributes 28 are not known until during the data transfer initiation of the execution phase. Accordingly, certain embodiments below discuss possibilities for providing the metadata and/or attributes 28 prior to data transfer.

Figure 7:
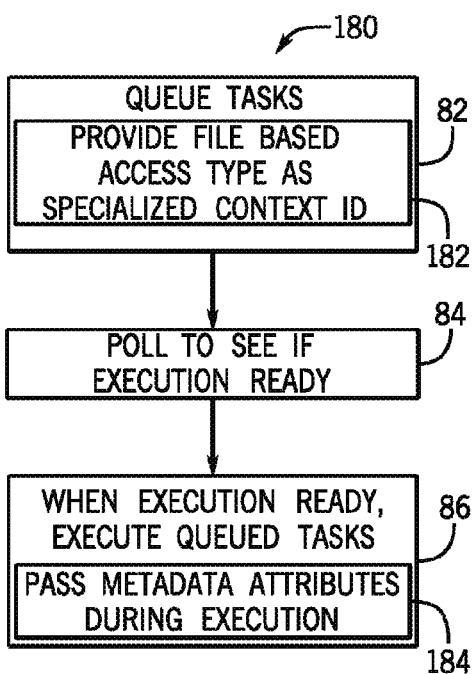
FIG. 7 illustrates a flowchart for the detailed packet level transmission of FIG. 6, in accordance with an embodiment.

FIG. 7 illustrates a process 180 for providing metadata using a specialized context identifier of a CMD44 command 88, in accordance with an embodiment. As mentioned above, one or more tasks read and/or writes) may be queued by the queuing phase 82. The queued commands may include an indicator 98 by providing a specialized context identifier 164 in the command (block 182). For example, in FIG. 6, the write tasks 93 include the indicator 98 as a specialized context identifier 164 in bits 25-28 of the CMD44 88.

Next, the polling phase 84 is initiated to determine which and how many of the tasks 93 and/or 95 are ready for implementation. For example, the device 14 may provide queue status information 114 that enables the host 12 to determine the task 93 and/or 95 that are ready for implementation.

When the device 14 is ready for the execution of particular tasks 93 and/or 95, the execution phase 86 begins. The tasks 93 and/or 95 are executed from the host 12 to the device 14. As indicated in FIG. 7, the metadata and/or attributes 28 are provided in headers during the data transfer (block 184). Accordingly, the metadata and/or attributes 28 are provided during the execution phase. In some embodiments, this may limit certain functionalities of the device 14, however, in other embodiments, metadata and/or attributes 28 provided during the execution phase may also be useful.

As mentioned above, it may be useful to provide the metadata and/or attributes 28 prior to the execution phase 86. For example, earlier provision of the metadata and/or attributes 28 may enable the metadata and/or attributes 28 to be used during the execution phase 86. The following embodiments illustrated techniques for providing the metadata and/or attributes 28 prior to the execution phase 86 (e.g., during the queuing phase 82). This may be done, for example, by providing a context indication that indicates a write operation 93 relates to metadata and/or attribute 28 transmissions. The metadata and/or attributes 28 may then be provided via one or more commands in the queuing phase 82.

b. Embodiments where Attributes are Transmitted at Queuing Phase

As mentioned above, in certain embodiments, the attributes may be transferred from the host device 12 to the managed memory system 14 during the queuing phase. Transferring the attributes during the queuing phase may be more desirable than transferring the attributes during the execution phase, as the attributes may be available for use prior to the execution of tasks in the execution phase.

1. Transmitting an Access Type and Attributes Via CMD44

For example, returning to FIG. 6, in some embodiments, the file access type indicator 98 may be provided by an unused bit (e.g., a bit reserved for future use, such as bit 21). The metadata flag may be provided in the tag indication 106 (e.g., at bit 29). Accordingly, the metadata flag may be provided in the queuing phase 82, prior to the execution phase 86, via the CMD44 commands 88.

Further, in some embodiments, the tag indication 106 (e.g., at bit 29), and the unused bit 96 (e.g., at bit 21 and/or 22) may be used in conjunction with the context identifier 164 (e.g., at bits 25-28) to provide immediate partition access along with the file-based access described herein. For example, the unused bit 96 may be used as an immediate partition access flag 162. The immediate partition access flag may indicate whether the context identifier 164 represents a legacy context identifier (e.g., by being set to "0") or the context identifier 164 represents a target partition for immediate access (e.g., by being set to "1"). In such embodiments, the unused bits 96 (e.g., bit 22) may also be used as a file-based access indicator 166 (e.g., to indicate that metadata and/or attributes 28 are being transmitted). When the file-based access indicator is set to "1" the tag indicator 106 may describe what metadata and/or attributes 28 are being provided via the context identifier 164. For example, when the indicator 166 is set to "1" and the tag indicator 29 is set to "0", the information transmitted may be file identifiers associated with data blocks. When the tag indicator 29 is set to "1", the information transmitted may be a metadata flag associated with the data.

When the indicator 166 is set to "1" and the immediate partition access indicator 162 is set to "0", file-based without immediate partition access is implemented. Further, when the indicator 166 is set to "1" and the immediate partition access indicator 162 is set to "1", file-based and immediate partition access is implemented.

2. Transmitting an Access Type and Attributes Via a New Command

Figure 8:
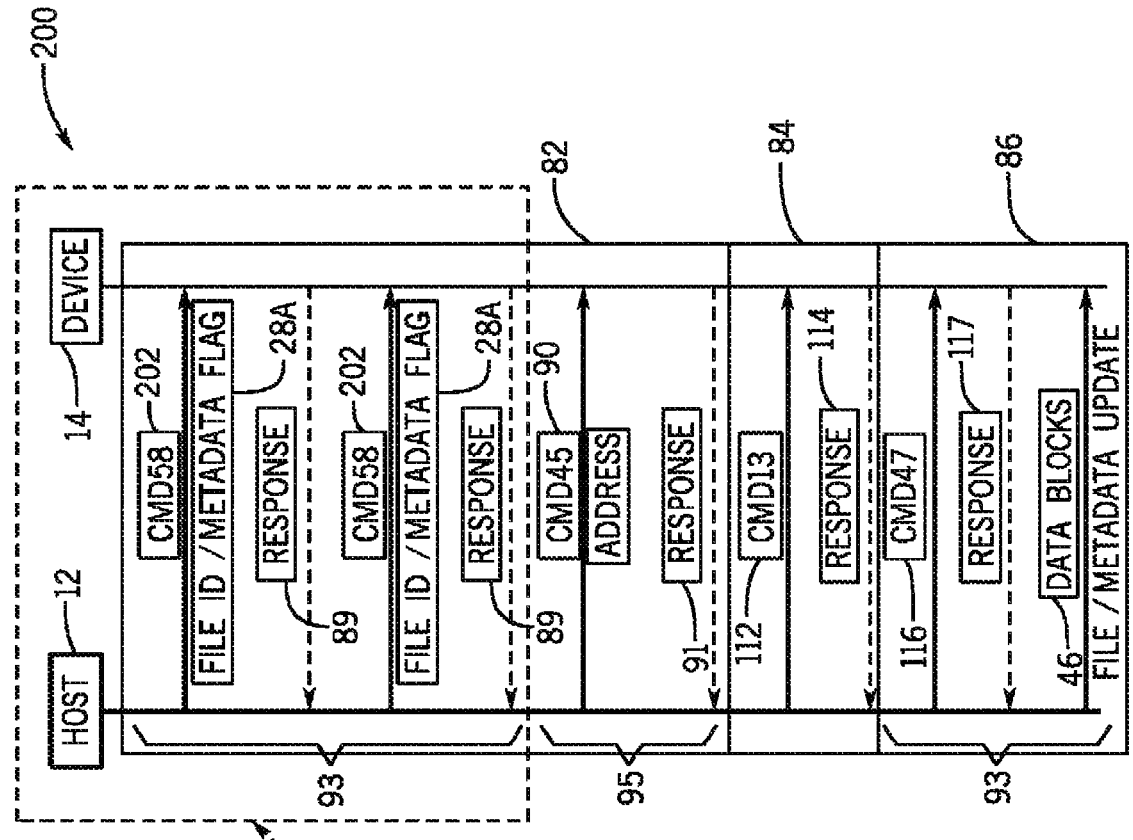
FIG. 8 illustrates a detailed packet level transmission for providing file metadata, using a new command of the memory system protocol that specifies the access type and metadata, in accordance with an embodiment.

Turning now to an embodiment where a new command is introduced for use in the protocol 16 communications, FIG. 8 illustrates a detailed packet level transmission 200 for providing file metadata, using a new command of the memory system protocol that specifies the access type and metadata, in accordance with an embodiment. Similar to the other command queuing embodiments, transmission 200 includes a queuing phase 82, a polling phase 84, and an execution phase 86.

Unlike the embodiments of FIGS. 4 and 6, the current embodiment provides both the file-based access indicator and the metadata and/or attributes 28 (e.g., the file identifier and/or metadata flag) in the queuing phase 82. This is done by introducing a new command code (e.g., CMD58 202) that can provide the file-based access indicator 98 as well as provide a header (e.g., a 4 byte header) that contains the metadata and/or attributes 28 (or portions of the metadata and/or attributes 28A, 28B, etc.).

The CMD58 commands 202 may replace CMD44 commands (e.g., commands 88 of FIGS. 4 and 6). Similar to the response triggered by receiving CMD44 commands 88 in FIGS. 4 and 6, upon receiving and/or processing the CMD58 commands 202, the device 14 may provide a response 89 to the host 12. Further, any number of CMD58 commands 202 may be provided in the queuing phase 82. The CMD45 commands 90 may be used to indicate a start address 87 for a read and/or write operation associated with the tasks 93 and/or 95.

Eventually, the host 12 may schedule a polling inquiry (e.g., the polling phase 84). For example, a series of CMD13 commands 112 may be provided by the host 12 to the device 14, to determine if the device is ready to begin the execution phase 86. The device 14 responds with queue status information 114. The host 12 can then decide whether queued tasks are ready for execution.

Once an indication is received that the device 14 is ready for task execution, the host 12 may initiate the execution phase 86. The host 12 may provide one or more CMD47 commands 116 and/or CMD46 commands 118. In response, the device 14 may provide a response to the host 12. Subsequently, when the host 12 provides data writes (e.g., using CMD47 commands 116), data blocks 46 may be provided by the host 12 to the device 14.

Unlike the embodiments of FIGS. 4 and 6, the metadata and/or attributes 26 are transmitted during the queuing phase 82, and thus, are available for use during the execution phase 86. Accordingly, the metadata and/or attributes 28 may be used to facilitate the file metadata and/or attribute 28-based placement techniques described in the discussion of FIG. 2.

Figure 9:
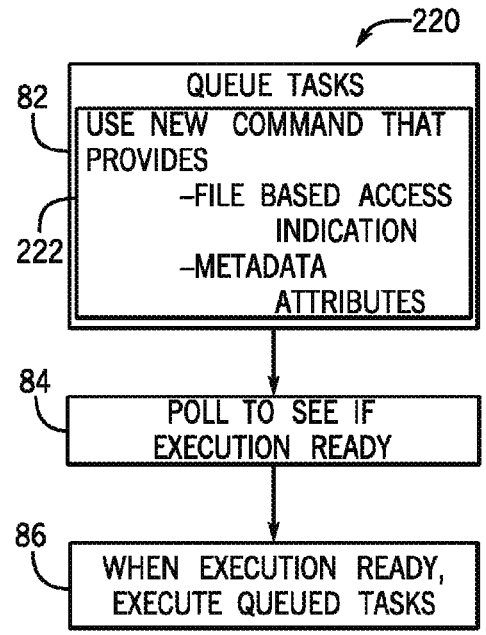
FIG. 9 illustrates a flowchart for the detailed packet level transmission of FIG. 8, in accordance with an embodiment.

FIG. 9 illustrates a process 220 for providing metadata using a new command (e.g., CMD58 202 of FIG. 8), in accordance with an embodiment. As mentioned above, one or more tasks (e.g. read and/or writes) may be queued by the queuing phase 82. The queued commands 202 may accept an indicator 98 and/or the metadata and/or attributes 28, which may be provided to the device 14 during the queuing phase 82. For example, in FIG. 8, the write tasks 93 are queued using the CMD58 202, which provides the indicator 98, the file identifier, and/or a metadata flag (block 222).

Next, the polling phase 84 is initiated to determine which and how many of the tasks 93 and/or 95 are ready for implementation. For example, the device 14 may provide queue status information 114 that enables the host 12 to determine the task 93 and/or 95 that are ready for implementation.

When the device 14 is ready for the execution of particular tasks 93 and/or 95, the execution phase 86 begins. The tasks 93 and/or 95 are executed from the host 12 to the device 14. As indicated in FIG. 8, the metadata and/or attributes 28 are provided in headers during the queuing phase. Accordingly, the metadata and/or attributes 28 may be used during the execution phase.

3. Transmitting an Access Type Via a Context Identifier

As above, some embodiments with a custom queuing command may use a specialized context identifier to indicate file-based access. FIGS. 10-15 illustrate a detailed packet level transmissions for providing file metadata, using a series of commands of the memory system protocol that specify the context and metadata, in accordance with embodiments.

A. Transmitting Attributes Via a New Command

Figure 10:
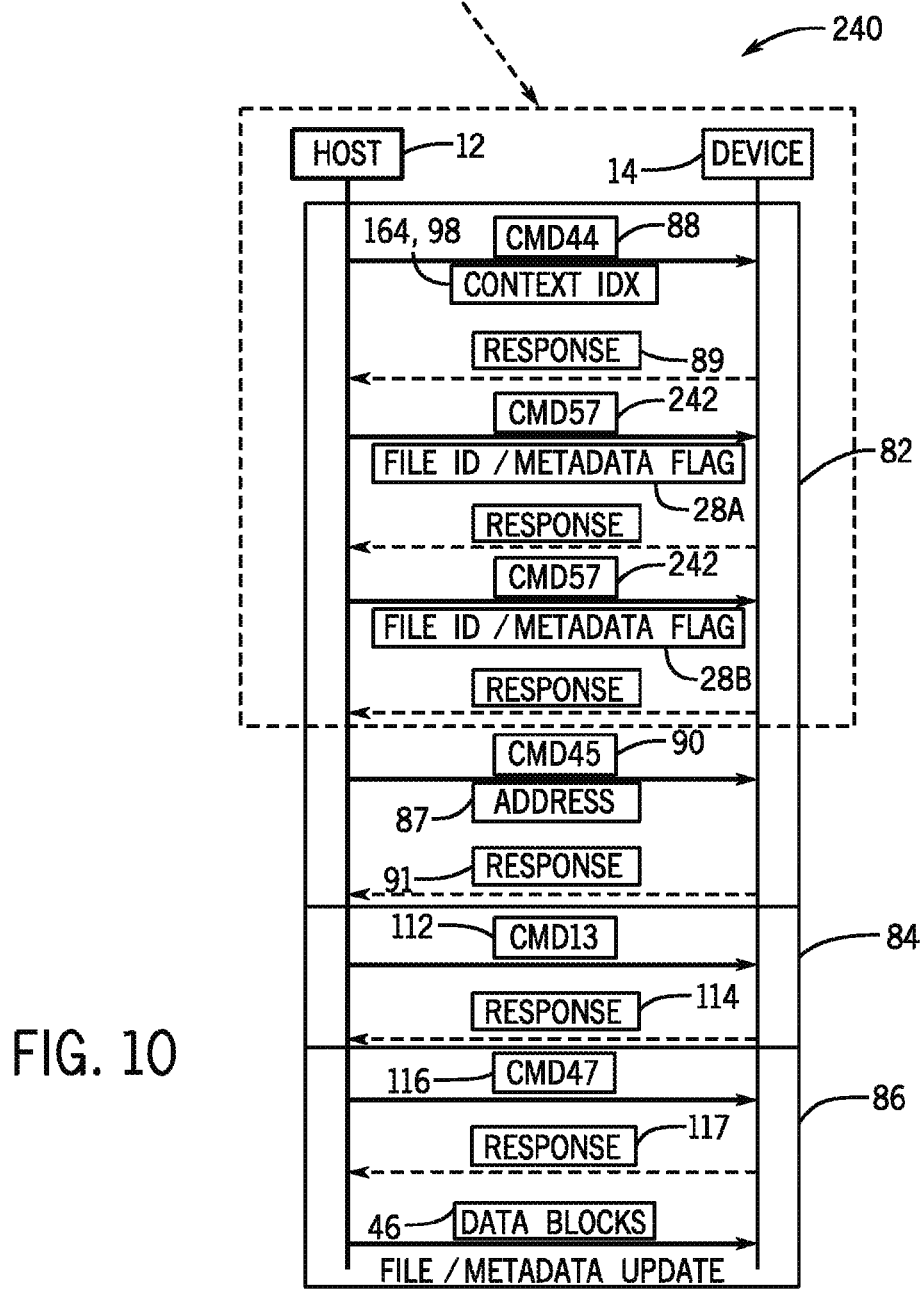
FIG. 10 illustrates a detailed packet level transmission for providing file metadata, using a series of new commands of the memory system protocol that specify the context and metadata, in accordance with embodiments.

Starting first with the embodiment of FIG. 10, FIG. 10 illustrates a detailed packet level transmission 240 for providing file metadata and/or attributes 28, using a specialized context identifier 164 in combination with a new command 242 (e.g., a CMD57 command).

Once again, the packet level transmission 240 includes a queuing phase 82, a polling phase 84, and an execution phase 86. In the current embodiment, the indicator 98 may be a specialized context identifier 164 that is transferred to the device 14 using a CMD44 command 88. Additionally, the metadata and/or attributes 28 may be provided in blocks (e.g., 4 byte blocks, as illustrated), using a new command 242 (e.g., a CMD57 command). The new command 242 is issued during the command queuing phase 82 to transfer the header (e.g., having the metadata and/or attributes 28) to the device 14. Accordingly, similar to the embodiment of FIG. 8, the current embodiment transfers the metadata and/or attributes 28 prior to the execution phase 86, enabling usage of the metadata and/or attributes 28 during the execution phase 86.

Eventually, the host 12 may schedule a polling inquiry (e.g., the polling phase 84). For example, a series of CMD13 commands 112 may be provided by the host 12 to the device 14, to determine if the device is ready to begin the execution phase 86. The device 14 responds with queue status information 114. The host 12 can then decide whether queued tasks are ready for execution.

Once an indication is received that the device 14 is ready for task execution, the host 12 may initiate the execution phase 86. The host 12 may provide one or more CMD47 commands 116 and/or CMD46 commands 118. In response, the device 14 may provide a response 117 to the host 12. Subsequently, when the host 12 provides data writes (e.g., using CMD47 commands 116), data blocks 46 may be provided by the host 12 to the device 14.

Unlike the embodiments of FIGS. 4 and 6, the metadata and/or attributes 26 are transmitted during the queuing phase 82, and thus, are available for use during the execution phase 86. Accordingly, the metadata and/or attributes 28 may be used to facilitate the file metadata and/or attribute 28-based placement techniques described in the discussion of FIG. 2.

Figure 11:
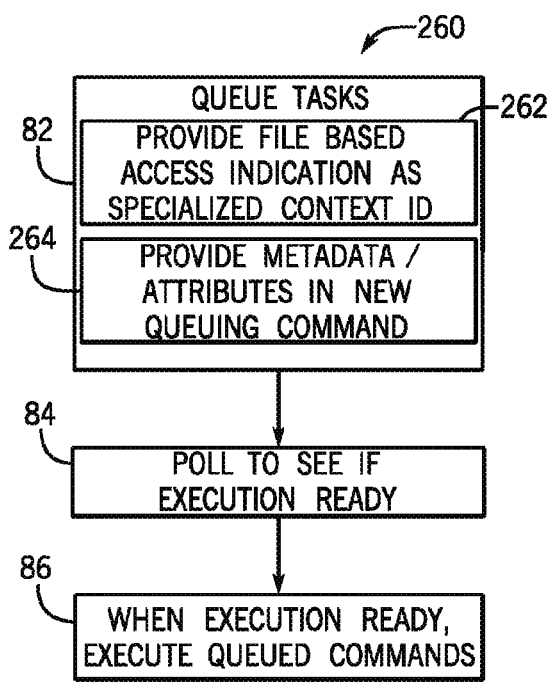
FIG. 11 illustrates a flowchart for the detailed packet level transmission of FIG. 10, in accordance with an embodiment.

FIG. 11 illustrates a process 260 for providing a specialized context identifier 164 indicator 98 and metadata and/or attributes 28 using a new command (e.g., CMD57 242 of FIG. 8), in accordance with an embodiment. As mentioned above, one or more tasks (e.g. read and/or writes) may be queued by the queuing phase 82. The queued commands 202 may provide an indicator 98 via a specialized context identifier 164 (block 262). Further, a new queuing command 242 may provide the metadata and/or attributes 28 to the device 14 during the queuing phase 82 (block 264). For example, in FIG. 10, the write tasks 93 are queued using a specialized context identifier 164 in a CMD44 command 88 and the metadata and/or attributes 28 are provided using a new command 242 (e.g., CMD57), Next, the polling phase 84 is initiated to determine which and how many of the tasks 93 and/or 95 are ready for implementation. For example, the device 14 may provide queue status information 114 that enables the host 12 to determine the task 93 and/or 95 that are ready for implementation.

When the device 14 is ready for the execution of particular tasks 93 and/or 95, the execution phase 86 begins. The tasks 93 and/or 95 are executed from the host 12 to the device 14. As indicated in FIG. 10, the metadata and/or attributes 28 are provided in headers during the queuing phase. Accordingly, the metadata and/or attributes 28 may be used during the execution phase.

B. Transmitting Attributes Via Several CMD45 Commands

Figure 12:
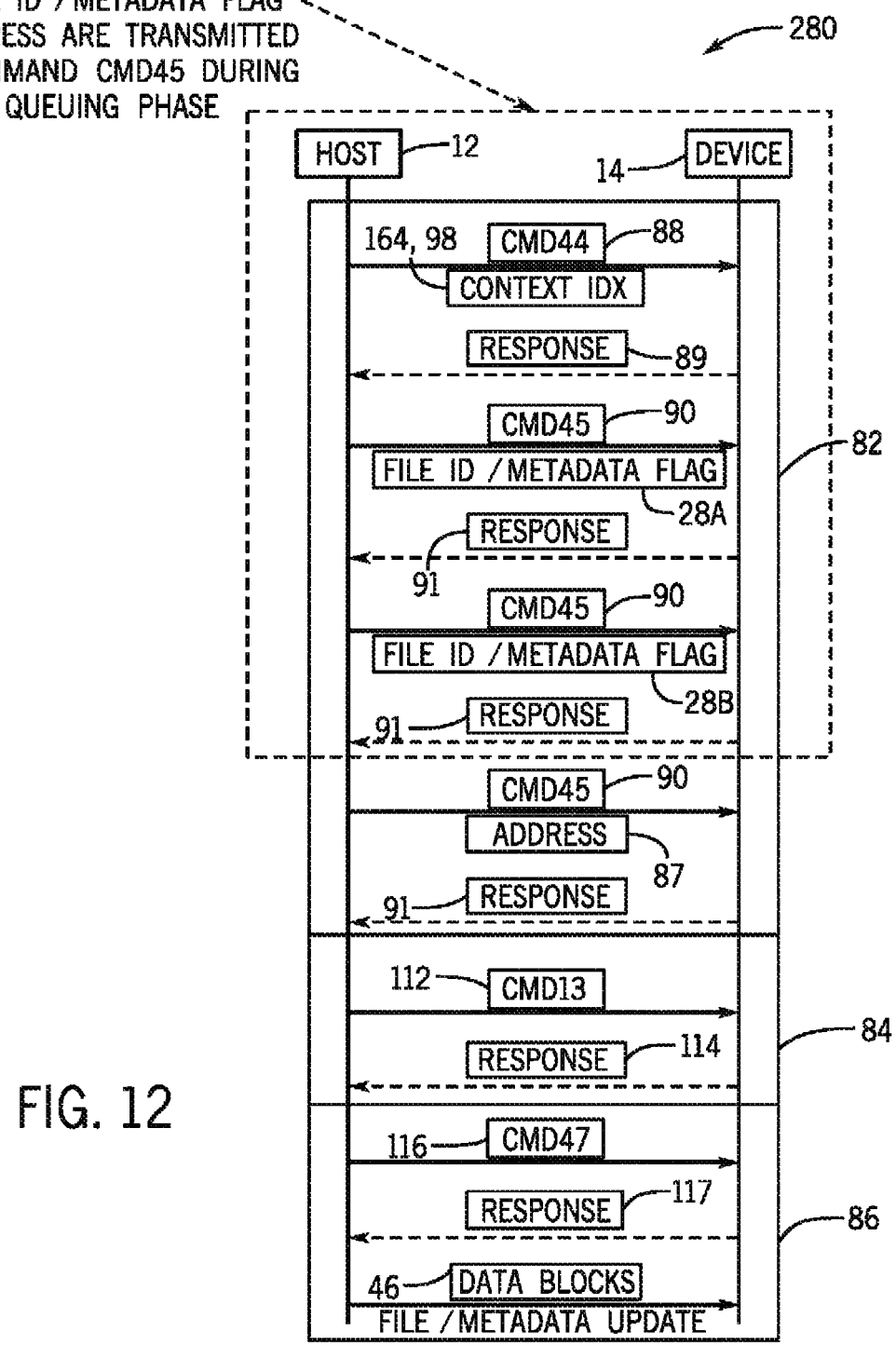
FIG. 12 illustrates a detailed packet level transmission for providing file metadata, using a series of CMD45 commands of the memory system protocol that specify the context and metadata, in accordance with embodiments.

FIG. 12 illustrates a detailed packet level transmission 280 for providing file metadata and/or attributes 28 using one or more CMD45 commands 90 and an indicator 98 via a specialized context identifier 164, in accordance with an embodiment. In the embodiment of FIG. 12, the queuing phase 82 includes CMD44 commands 88 and CMD45 commands 90. The CMD44 commands 88 provide an indicator 98 via a specialized context identifier 164. Further, the CMD45 commands 90 provide at least a portion of the metadata and/or attributes 28. For example, in the illustrated embodiment, 4 byte blocks of 8 bytes of metadata and/or attributes 28 are provided via two CMD45 commands 90. As above, the CMD44 commands 88 result in a response 89 and the CMD45 commands 90 result in a response 91 from the device 14. After the transfer of the metadata and/or attributes 28, a subsequent CMD45 command 90 may be used to provide a start address 87 of the queued operations associated with the tasks 93 and/or 95.

From there, the polling phase and the execution phase may be implemented similar to the embodiment of FIG. 10. Eventually, the host 12 may schedule a polling inquiry (e.g., the polling phase 84). For example, a series of CMD13 commands 112 may be provided by the host 12 to the device 14, to determine if the device is ready to begin the execution phase 86. The device 14 responds with queue status information 114. The host 12 can then decide whether queued tasks are ready for execution.

Once an indication is received that the device 14 is ready for task execution, the host 12 may initiate the execution phase 86. The host 12 may provide one or more CMD47 commands 116 and/or CMD46 commands 118. In response, the device 14 may provide a response 117 to the host 12.

Subsequently, when the host 12 provides data writes (e.g., using CMD47 commands 116), data blocks 46 may be provided by the host 12 to the device 14.

The metadata and/or attributes 26 are transmitted during the queuing phase 82, and thus, are available for use during the execution phase 86. Accordingly, the metadata and/or attributes 28 may be used to facilitate the file metadata and/or attribute 28-based placement techniques described in the discussion of FIG. 2.

Figure 13:
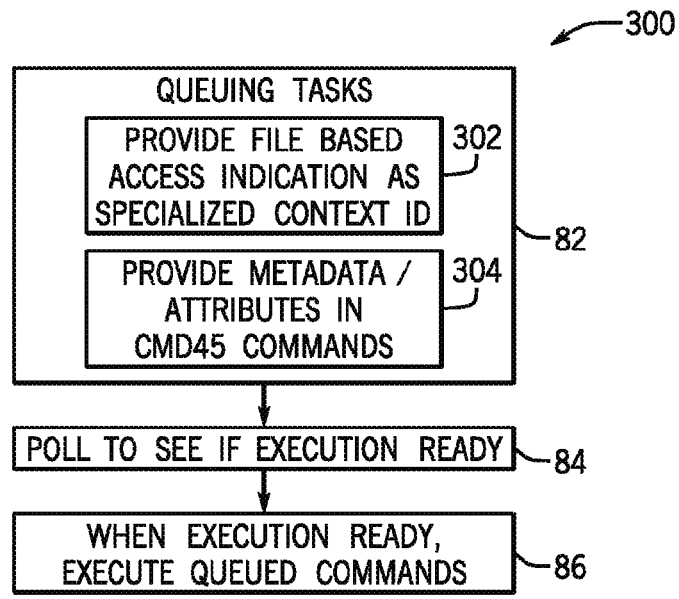
FIG. 13 illustrates a flowchart for the detailed packet level transmission of FIG. 12, in accordance with an embodiment.

FIG. 13 illustrates a process 300 for providing a specialized context identifier 164 indicator 98 and metadata and/or attributes 28 using CMD45 commands 90, in accordance with an embodiment. As mentioned above, one or more tasks (e.g. read and/or writes) may be queued by the queuing phase 82. The queued commands 202 may provide an indicator 98 via a specialized context identifier 164 (block 302). Further, CMD45 commands 90 may provide the metadata and/or attributes 28 to the device 14 during the queuing phase 82 (block 304). For example, in FIG. 12, the write tasks 93 are queued using a specialized context identifier 164 in a CMD44 command 88 and the metadata and/or attributes 28 are provided using CMD45 commands 90. By reusing the CMD45 commands 90, no new commands need be introduced to provide the metadata and/or attributes 28.

Next, the polling phase 84 is initiated to determine which and how many of the tasks 93 and/or 95 are ready for implementation. For example, the device 14 may provide queue status information 114 that enables the host 12 to determine the task 93 and/or 95 that are ready for implementation.

When the device 14 is ready for the execution of particular tasks 93 and/or 95, the execution phase 86 begins. The tasks 93 and/or 95 are executed from the host 12 to the device 14. As indicated in FIG. 12, the metadata and/or attributes 28 are provided in headers during the queuing phase. Accordingly, the metadata and/or attributes 28 may be used during the execution phase.

C. Transmitting Attributes Via Several CMD44/45 Pairs

Figure 14:
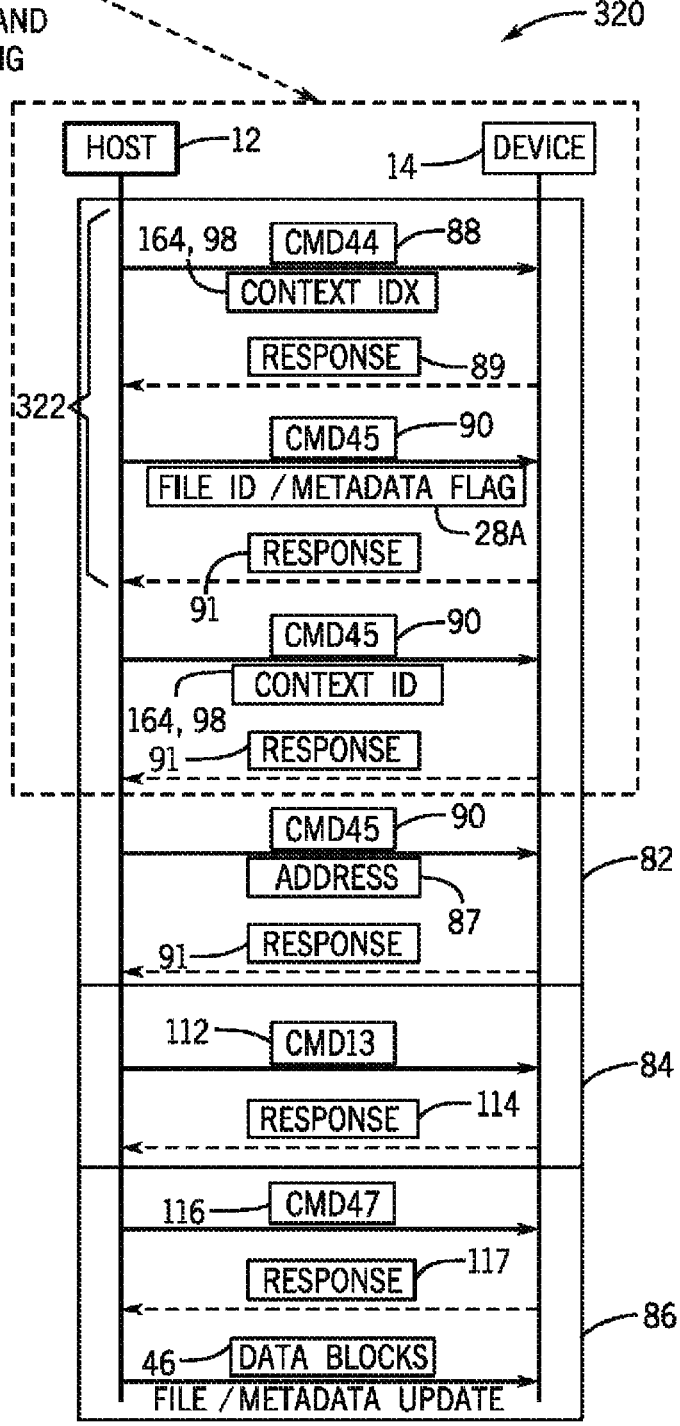
FIG. 14 illustrates a detailed packet level transmission for providing file metadata, using a series of CMD44/CMD45 command pairs that specify the context and metadata, in accordance with embodiments.

In some embodiments, pairs of commands may be used to provide the indicator 98 and the metadata and/or attributes 28. FIG. 14 illustrates such an embodiment 320. In FIG. 14, the queuing phase 82 includes pairs 322 of CMD44 commands 88 and CMD45 commands 90. In some embodiments, the CMD44 commands 88 provide an indicator 98 via a specialized context identifier 164. Alternatively, a file access type indicator 98 may be provided via another bit in the CMD44 command 88 (e.g., bit 22). Further, the CMD45 commands 90 provide at least a portion of the metadata and/or attributes 28. For example, in the illustrated embodiment, pairs 322 may be provided until an entire file identity and/or metadata flag is provided to the device 14. As above, the CMD44 commands 88 result in a response 89 and the CMD45 commands 90 result in a response 91 from the device 14. After the transfer of the metadata and/or attributes 28, a subsequent CMD45 commands 90 may be used to provide a start address 87 of the queued operations associated with the tasks 93 and/or 95.

From there, the polling phase and the execution phase may be implemented similar to the embodiments of FIGS. 10 and 12. Eventually, the host 12 may schedule a polling inquiry (e.g., the polling phase 84). For example, a series of CMD13 commands 112 may be provided by the host 12 to the device 14, to determine if the device is ready to begin the execution phase 86. The device 14 responds with queue status information 114. The host 12 can then decide whether queued tasks are ready for execution.

Once an indication is received that the device 14 is ready for task execution, the host 12 may initiate the execution phase 86. The host 12 may provide one or more CMD47 commands 116 and/or CMD46 commands 118 per pair 322. In response, the device 14 may provide a response 117 to the host 12. Subsequently, when the host 12 provides data writes (e.g., using CMD47 commands 116), data blocks 46 may be provided by the host 12 to the device 14.

4. Transmitting an Access Type and Attributes Via CMD44/CMD45/CMD46 Sequences

Building upon the CMD44/45 pairing embodiment 320, in some embodiments, a CMD48 may be used to extend command queuing functionalities and/or enhance task management and device management functions. A command queuing extension bit (CQEXT bit) may be added via an unused bit of CMD44 commands 88 (e.g., a bit reserved for future use, such as unused bit 96 at bit 22 of FIG. 6). When the CQEST bit is set to "1", the pairs 322 may be followed by a CMD48 command, which may describe, for example, a file identifier hash, the metadata flag, etc. The CMD48 command may be lined to one or more task descriptors and new task management descriptors may be created to describe a file identifier hash and/or metadata flag task.

The metadata and/or attributes 26 are transmitted during the queuing phase 82, and thus, are available for use during the execution phase 86. Accordingly, the metadata and/or attributes 28 may be used to facilitate the file metadata and/or attribute 28-based placement techniques described in the discussion of FIG. 2.

Figure 15:
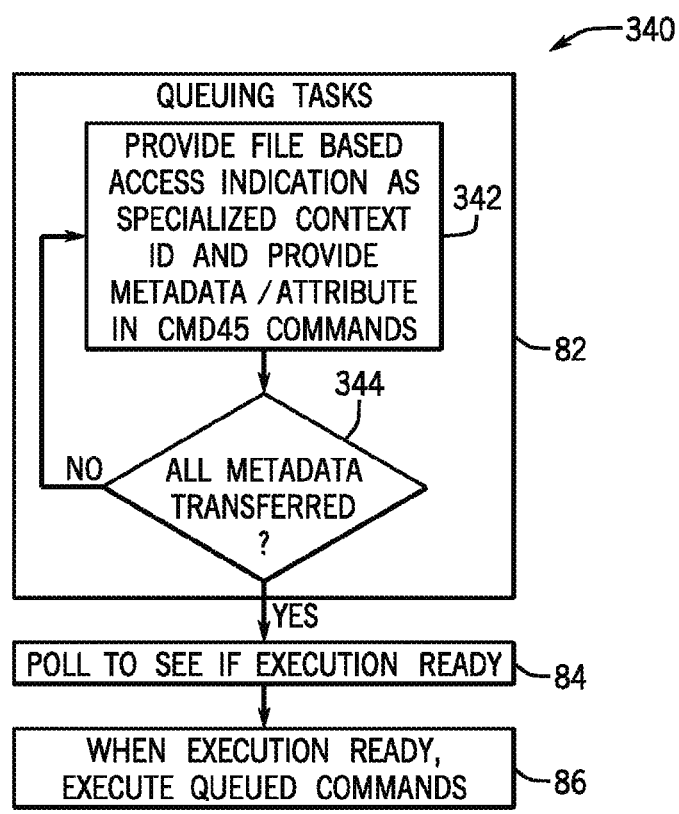
FIG. 15 illustrates a flowchart for the detailed packet level transmission of FIG. 14, in accordance with an embodiment.

FIG. 15 illustrates a process 340 for providing an indicator 98 via a specialized context identifier 164 and providing metadata and/or attributes 28 using CMD45 commands 90, in accordance with an embodiment. As mentioned above, one or more tasks (e.g. read and/or writes) may be queued by the queuing phase 82. The queued commands 202 may provide an indicator 98 via a specialized context identifier 164 of a CMD44 command 88 and provide the metadata and/or attributes 28 to the device 14 via one or more corresponding CMD45 commands 90. The CMD44 commands 88 and CMD45 commands 90 may be paired and provided as a paired unit (block 342). Additional pairs may be provided until all metadata and/or attributes during the queuing phase 82 (e.g., as determined by decision block 344).

Next, the polling phase 84 is initiated to determine which and how many of the tasks 93 and/or 95 are ready for implementation. For example, the device 14 may provide queue status information 114 that enables the host 12 to determine the task 93 and/or 95 that are ready for implementation.

When the device 14 is ready for the execution of particular tasks 93 and/or 95, the execution phase 86 begins. The tasks 93 and/or 95 are executed from the host 12 to the device 14. As indicated in FIG. 14, the metadata and/or attributes 28 are provided in headers during the queuing phase. Accordingly, the metadata and/or attributes 28 may be used during the execution phase.

ii. Non-Command Queuing Embodiments

Having now discussed the embodiments where command queuing is involved, the discussion now turns to non-command queued embodiments, where a single command is sent by the host 12 to the device 14. For non-command queuing embodiments, multiple options for transmitting the metadata and/or attributes 28 may exist. For example, one option is to provide the metadata and/or attributes 28 via a header of a write operation. Additionally, registers, such as an Extended Card Specific Data (CSD) register (EXT_CSD register), may be used to transfer the metadata and/or attributes 28. Further, another option may be to extend a packed command mechanism to enable transmission of the metadata and/or attributes 28.

a. Header Based Transactions

Figure 16:
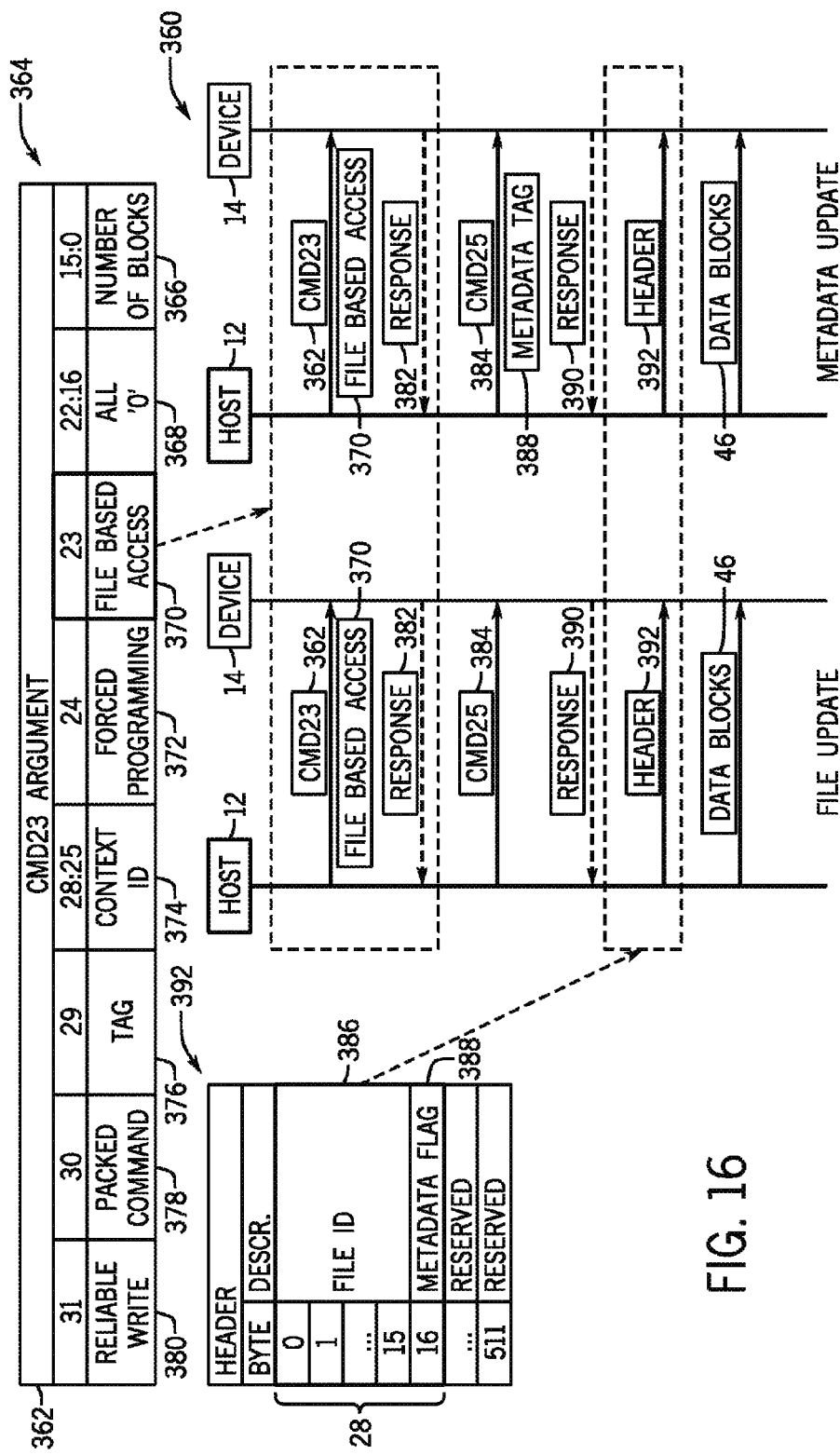
FIG. 16 illustrates a detailed packet level transmission for providing file metadata, using a header-based transaction of the memory system protocol, in accordance with an embodiment.

Turning first to a discussion of header-based metadata and/or attribute 28 transmission, FIG. 16 illustrates a detailed packet level transmission 360 for providing file metadata and/or attributes 28, using a header-based transaction of the memory system protocol, in accordance with an embodiment. As illustrated in FIG. 16, one or more CMD23 commands 362 may be provided from the host 12 to the device 14 to describe the number of sectors that will be written in a write operation.

The protocol 16 may define a particular bit structure 364 for the CMD23 commands 362. For example, bits 0-15 may include an identification 366 of a number of blocks of data for the write operation. Bits 16-22 may all be "0", as indicated by 368. Bit 23 may be unused in the protocol 16. Accordingly, bit 23 may be assigned to provide an indication 370 of whether or not the write operation is a special write (e.g., write of metadata and/or attributes 28). Forced programming data 372 may be provided in bit 24. A context identifier 374 may be provided in bits 25-28. A tag 376 may be provided in bit 29. Packed command data 378 may be provided in bit 30 and a reliable write indicator 380 may be provided in bit 31.

As the host 12 desires to provide new write operations to the device 14, one or more CMD23 commands 362 are provided to the device 14. The indication 370 at bit 23 may be set as "1" when metadata and/or attributes 28 will be provided.

In response to the CMD23 commands 362, the device 14 may provide a response 382, indicating that the CMD23 commands 362 were received and/or that the device 14 is ready to receive the actual write operation. Upon receipt of the response 382, the host 12 may provide a write command start address (e.g., a CMD25 command 384), which may trigger the actual data write operation. Further, the host may gather the metadata and/or other attributes 28 (e.g., a file identifier and/or a metadata flag) and provide the metadata and/or other attributes 28 upon receiving a CMD25 response 390 from the device 14. For example, as illustrated, provision of a write header 392 may precede provision of the data blocks 46.

As illustrated, the write header 392 may incorporate the metadata and/or attributes 28, such as the file identifier 386 and/or metadata flag 388). Accordingly, upon provision of the header 392, the device 14 has access to the metadata and/or attributes 28.

b. Register Based Configuration

Figure 17:
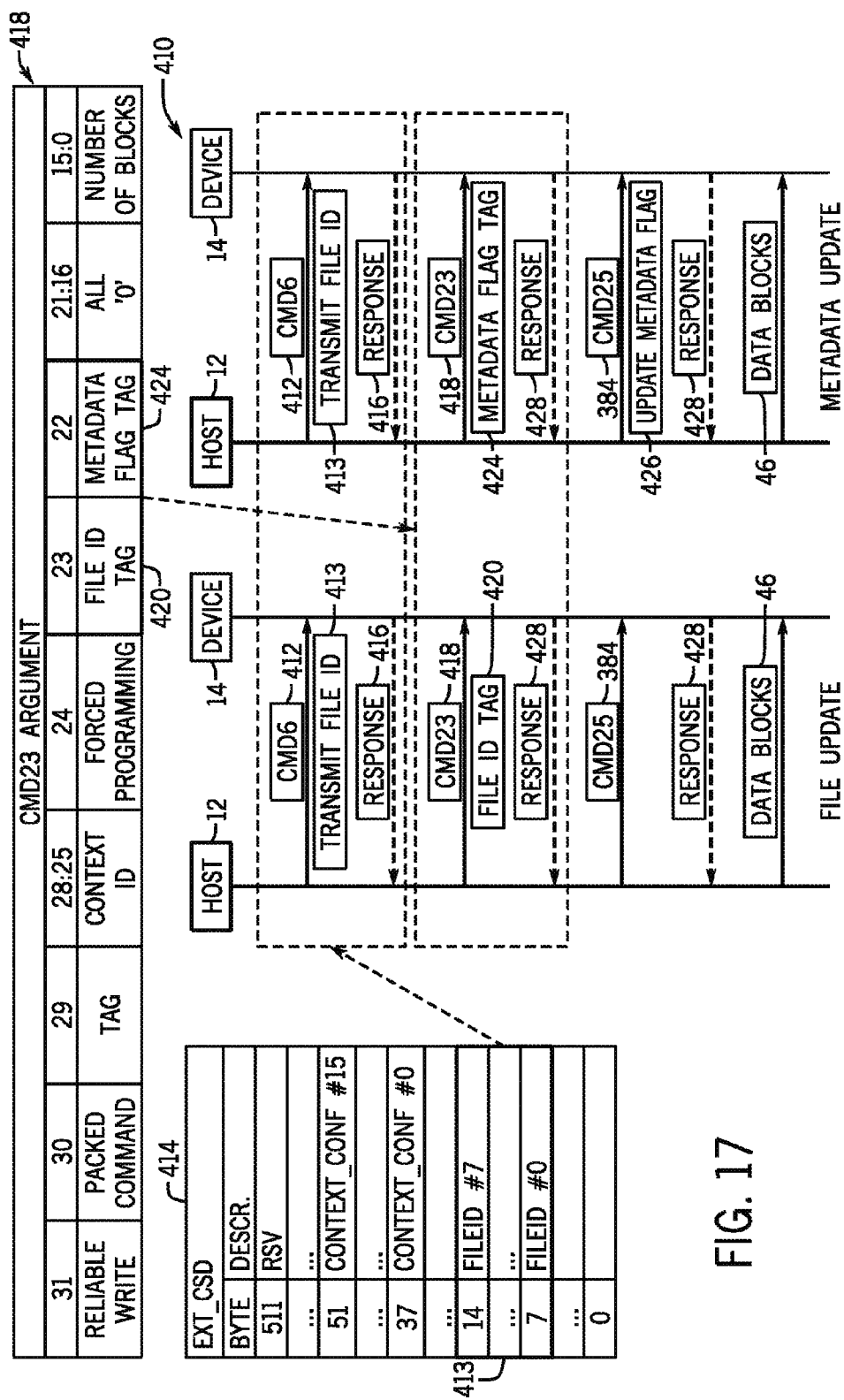
FIG. 17 illustrates a detailed packet level transmission for providing file metadata, using a register-based transaction of the memory system protocol, in accordance with an embodiment.

In some embodiments, rather than transmitting the metadata and/or attributes 28 during the write operation, the metadata and/or attributes 28 may be provided to a register of the device 14 prior to the write operation. For example, FIG. 17 illustrates a detailed packet level transmission 410 for providing file metadata, using a register-based transaction (e.g., a CMD6 command 412) of the memory system protocol, in accordance with an embodiment. The CMD6 command 412 may be used to provide certain metadata and/or attributes 28 (e.g., file identification 413) to a register (e.g., Extended Card Specific Data (CSD) register 414). In the current embodiment, 8 unused bytes (e.g., bytes 7-14) of the Extended CSD register 414 are used to encode the file identifier 413.

Upon receiving and processing the CMD6 command 412, the device 14 may provide a response 416 to the host 12. The response 416 may indicate whether the CMD6 command 412 was processed successfully.

Subsequently, a CMD23 command 418 may provide context for a subsequent write command. For example, the CMD23 command 418 may provide an indication 420 that a subsequent command is a file identification update 422 or an indication 424 that a subsequent command is a metadata flag update 426. In the current embodiment, bits 23 and 22 provide the indications 420 and 424, respectively. In alternative embodiments, any unused bits may be used to provide the indications 420 and 424.

A response 428 may be provided in response to receiving and processing the CMD23 command 418. Upon receiving the response 428, the host 12 may determine that the write operation may proceed. Accordingly, a CMD25 command 384 may be provided to the device 14. The CMD25 may include a start address for the file identifier update and/or the metadata flag update.

Upon receiving and/or processing the CMD25 command 384, the device 14 may provide a response 428 to the host 12. The host may then send the data blocks 46 to the device 14.

c. Packed Command Extension

Figure 18:
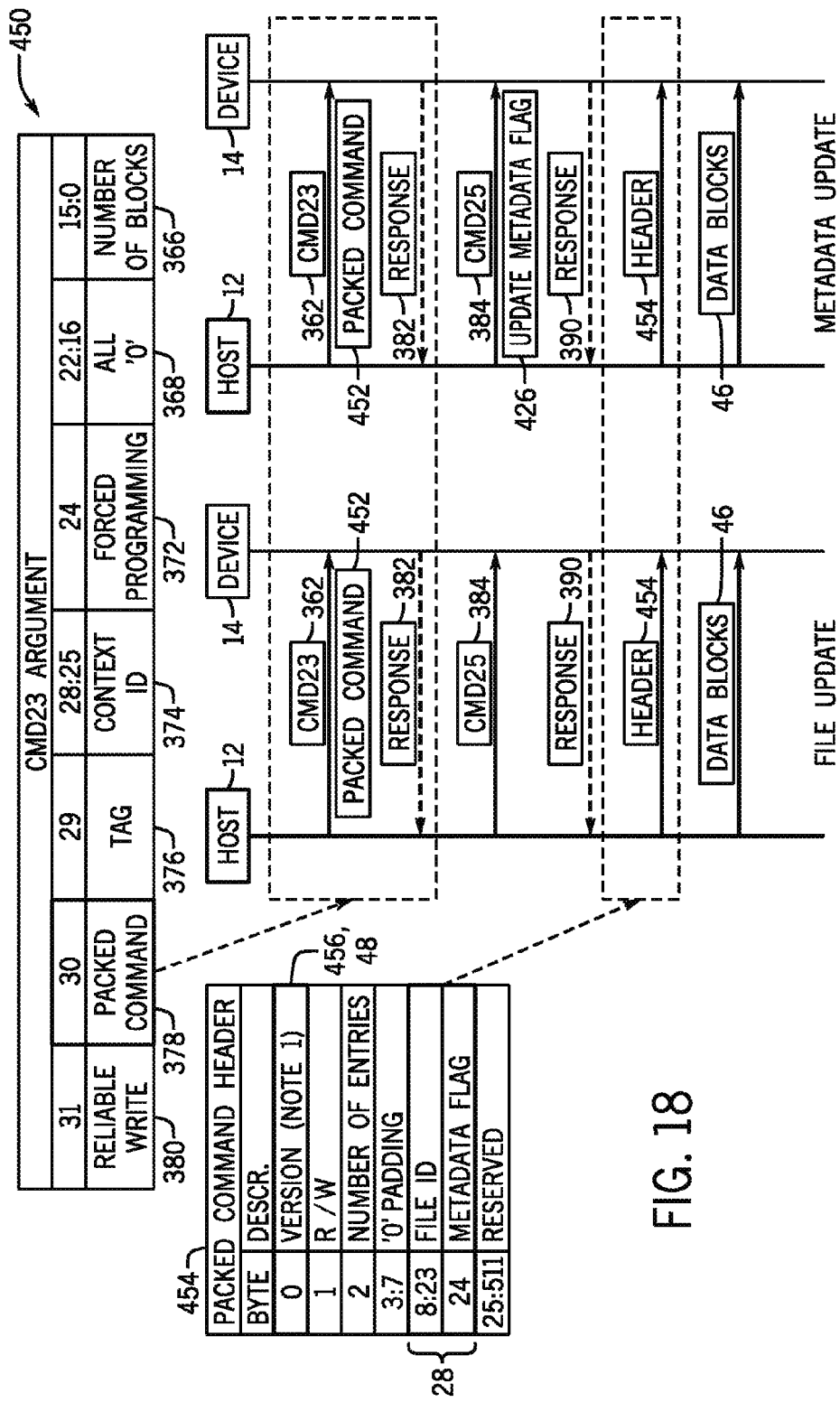
FIG. 18 illustrates a detailed packet level transmission for providing file metadata, using packed command extensions of the memory system protocol, in accordance with an embodiment.

In some embodiments, metadata and/or attributes 28 may be provided with packed command functionality. Packed commands allow multiple write operations in a single transaction. FIG. 18 illustrates a detailed packet level transmission 450 for providing file metadata and/or attributes 28, using packed command extensions of the memory system protocol 16, in accordance with an embodiment.

As above, the protocol 16 may define a particular bit structure 364 for the CMD23 commands 362. For example, bits 0-15 may include an identification 366 of a number of blocks of data for the write operation. Bits 16-22 may all be "0", as indicated by 368. Bit 23 may be unused in the protocol 16. Forced programming data 372 may be provided in bit 24. A context identifier 374 may be provided in bits 25-28. A tag 376 may be provided in bit 29. Packed command data 378 may be provided in bit 30 and reliable write indicator 380 may be provided in bit 31.

As the host 12 desires to provide packed operations to the device 14, one or more CMD23 commands 362 are provided to the device 14. The CMD23 commands 362 include packed operations 452.

In response to the CMD23 commands 362, the device 14 may provide a response 382, indicating that the CMD23 commands 362 were received and/or that the device 14 is ready to receive the actual write operation. Upon receipt of the response 382, the host 12 may provide a write command (e.g., a CMD25 command 384), which may trigger the actual data write operation. Further, the host may gather the metadata and/or other attributes 28 (e.g., a file identifier 422 and/or a metadata flag 426) and provide the metadata and/or other attributes 28 upon receiving a CMD25 response 390 from the device 14. For example, as illustrated, provision of a packed command header 454 may precede provision of the data blocks 46. The packed command header 454 may include an version field 456 that may act as an indication 98 that a special write is to be executed (e.g. a file-based access). For example, the protocol may define that the version is 0. Thus, the version may be modified from zero to provide the indication 98.

When the indication 98 is present, the metadata and/or attributes 28 may be obtained from the packed command header 454. For example, in the current embodiment bytes 8-23 contain the file identifier update 422 and byte 24 includes the metadata flag update 426.

As illustrated, the write header 392 may incorporate the metadata and/or attributes 28, such as the file identifier 386 and/or metadata flag 388). Accordingly, upon provision of the header 392, the device 14 has access to the metadata and/or attributes 28.

Using the techniques provided herein, metadata and/or attributes 28 may be provided from higher levels of an operating system (e.g., a host 12) to a non-volatile managed memory system 14. This metadata and/or attributes 28 may enable new functionalities at the managed memory system 14, resulting in increased efficiencies in the managed memory system 14.

While the embodiments described herein may be susceptible to various modifications and alternative forms, specific embodiments have been shown by way of example in the drawings and have been described in detail herein. However, it should be understood that the disclosure is not intended to be limited to the particular forms disclosed. Rather, the disclosure is to cover all modifications, equivalents, and alternatives falling within the spirit and scope of the techniques and system described in the disclosure as defined by the following appended claims.

What is claimed is:

1. A memory device, comprising:
   a memory component configured to store data;
   controller circuitry, configured to:
      receive, from a host electronic device, one or more commands of a memory system protocol, wherein the one or more commands comprise:
         at least one write command, the write command comprising one or more blocks of data to be stored in the memory component; and
         file metadata, file attributes, or both related to a file, wherein the one or more blocks of data comprise a portion of the file; and
      execute the one or more commands, such that the blocks are stored in the memory component and the controller circuitry of the memory device can identify that the file metadata, the file attributes or both are associated with the blocks and the controller circuitry of the memory device has access to the file metadata, the file attributes or both;
   wherein the one or more commands comprise commands implemented without command queuing; and
   wherein the one or more commands comprise:
      a first command configured to encode the file metadata, the file attributes or both to a register;
      a second command configured to configured to indicate that the file metadata, the file attributes or both will be provided to the controller circuitry in a third command; and
      the third command configured to update, at the memory device, the encoded metadata, attributes, or both at the register.

2. The memory device of claim 1, wherein the one or more commands comprise commands implemented via command queuing, where a plurality of commands are queued prior to execution by the controller circuitry.

3. The memory device of claim 2, wherein the one or more commands comprise:
   a queue command comprising an indicator that the file metadata, the file attributes or both will be provided to the controller circuitry, wherein the file metadata, the file attributes or both are provided in a header of an execution command associated with the queue command.

4. The memory device of claim 3, wherein the one or more commands are commands of an embedded multimedia card (eMMC) protocol, wherein the queue command comprises a CMD44 command and the execution command comprises a CMD47 command.

5. The memory device of claim 2, wherein the one or more commands comprise:
   a queue command comprising a context indicator, the context indicator comprising a dedicated context that indicates that the file metadata, the file attributes or both will be provided to the controller circuitry, wherein the file metadata, the file attributes or both are provided in a header of an execution command associated with the queue command.

6. The memory device of claim 5, wherein the one or more commands are commands of an embedded multimedia card (eMMC) protocol, wherein the queue command comprises a CMD44 command and the execution command comprises a CMD47 command.

7. The memory device of claim 2, wherein the one or more commands comprise:
   at least one first queue command configured to provide a context indicator that the file metadata, the file attributes or both will be provided to the controller circuitry; and
   at least one second queue command configured to provide a header specifying the file metadata, the file attributes or both.

8. The memory device of claim 7, wherein the one or more commands are commands of an embedded multimedia card (eMMC) protocol, wherein the first queue command comprises a CMD44 command and the second queue command comprises a newly introduced command to the memory system protocol.

9. The memory device of claim 7, wherein the one or more commands are commands of an embedded multimedia card (eMMC) protocol, wherein the first queue command comprises a CMD44 command and the second queue command comprises a CMD45 command.

10. The memory device of claim 9, wherein the one or more commands comprise a plurality of CMD44 and CMD45 commands, wherein a number of pairs of CMD44 and CMD45 commands is based upon a size of the file metadata, the file attributes or both.

11. The memory device of claim 1, wherein the one or more commands comprise a first command configured with a packed command scheme;
   wherein the packed command scheme enables a plurality of transactions to be executed by the controller circuitry via one command;
   wherein the first command, a header associated with the first command, or both comprise an indicator that the file metadata, the file attributes or both will be provided to the controller circuitry, and
   wherein the header specifying the file metadata, the file attributes or both is received by the controller circuitry based upon receiving the first command.

12. The memory device of claim 11, wherein the one or more commands are commands of an embedded multimedia card (eMMC) protocol, wherein the first command comprises a CMD23 command, and wherein the indicator is specified in a bit of the CMD23 command that was previously defined by the eMMC protocol as reserved, unused, or both.

13. The memory device of claim 11, wherein the one or more commands are commands of an embedded multimedia card (eMMC) protocol, wherein the first command comprises a CMD23 command comprising packed commands, and wherein the indicator is specified as a version in the header.

14. The memory device of claim 1, wherein the one or more commands are commands of an embedded multimedia card (eMMC) protocol, wherein the first command comprises a CMD6 command, wherein the second command comprises a CMD23 command, and wherein the third command comprises a CMD25 command.

15. A host electronic device, comprising:
a file system storing one or more files, the files having associated file metadata, file attributes, or both;
driver circuitry, configured to:
provide one or more commands to a memory device, wherein the one or more commands conform to a memory system protocol used by the memory device, wherein the one or more commands comprise:
at least one write command, the write command comprising one or more blocks of data to be stored in the memory component, the one or more blocks of data comprising a portion of the one or more files; and
the file metadata, the file attributes, or both related to the file;
wherein the one or more commands enable the memory device to:
identify that the file metadata, file attributes or both are associated with the blocks; and
access the file metadata, the file attributes or both;
wherein the one or more commands comprise:
a first command configured to encode the file metadata, the file attributes or both to a register;
a second command configured to configured to indicate that the file metadata, the file attributes or both will be provided to the controller circuitry in a third command; and
the third command configured to update, at the memory device, the encoded file metadata, file attributes or both at the register.

16. The host electronic device of claim 15, wherein the one or more commands comprise:
a queue command comprising an indicator that the file metadata, the file attributes or both will be provided to the controller circuitry, wherein the file metadata, the file attributes or both are provided in a header of an execution command associated with the queue command.

17. The host electronic device of claim 16, wherein the one or more commands are commands of an embedded multimedia card (eMMC) protocol, wherein the queue command comprises a CMD44 command and the execution command comprises a CMD47 command.

18. The host electronic device of claim 15, wherein the one or more commands comprise:
a queue command comprising a context indicator, the context indicator comprising a dedicated context that indicates that the file metadata, the file attributes or both will be provided to the controller circuitry; wherein the file metadata, the file attributes or both are provided in a header of an execution command associated with the queue command.

19. The host electronic device of claim 18, wherein the one or more commands are commands of an embedded multimedia card (eMMC) protocol, wherein the queue command comprises a CMD44 command and the execution command comprises a CMD47 command.

20. The host electronic device of claim 15, wherein the one or more commands comprise:
at least one first queue command configured to provide a context indicator that the file metadata, the file attributes or both will be provided to the controller circuitry; and
at least one second queue command configured to provide a header specifying the file metadata, the file attributes or both.

21. The host electronic device of claim 20, wherein the one or more commands are commands of an embedded multimedia card (eMMC) protocol, wherein the first queue command comprises a CMD44 command and the second queue command comprises a newly introduced command to the memory system protocol.

22. The host electronic device of claim 20, wherein the one or more commands are commands of an embedded multimedia card (eMMC) protocol, wherein the first queue command comprises a CMD44 command and the second queue command comprises a CMD45 command, and wherein the one or more commands comprise a plurality of CMD44 and CMD45 commands, wherein a number of pairs is based upon a size of the file metadata, the file attributes or both.

23. The host electronic device of claim 15, wherein the one or more commands comprise a first command configured with a packed command scheme;
wherein the packed command scheme enables a plurality of transactions to be executed by the controller circuitry via one command;
wherein the first command, a header associated with the first command, or both comprise an indicator that the file metadata, the file attributes or both will be provided to the controller circuitry; and
wherein the header specifying the file metadata, the file attributes or both is received by the controller circuitry based upon receiving the first command.

24. The host electronic device of claim 23, wherein the one or more commands are commands of an embedded multimedia card (eMMC) protocol, wherein the first command comprises a CMD23 command, and wherein the indicator is specified in a bit of the CMD23 command that was previously defined by the eMMC protocol as reserved, unused, or both.

25. The host electronic device of claim 23, wherein the one or more commands are commands of an embedded multimedia card (eMMC) protocol, wherein the first command comprises a CMD23 command comprising packed commands, and wherein the indicator is specified as a version in the header.

26. The host electronic device of claim 15, wherein the one or more commands are commands of an embedded multimedia card (eMMC) protocol, wherein the first command comprises a CMD6 command, wherein the second command comprises a CMD23 command, and wherein the third command comprises a CMD25 command.

27. A memory device controller circuitry-implemented method, comprising:
receiving, from a host electronic device, one or more commands of a memory system protocol, wherein the one or more commands comprise:
at least one write command, the write command comprising one or more blocks of data to be stored in the memory component; and
file metadata, file attributes, or both related to a file, wherein the one or more blocks of data comprise a portion of the file; and executing the one or more commands, such that the blocks are stored in a memory component of the memory device and the controller circuitry of the memory device can identify that the file metadata, the file attributes or both are associated with the blocks and the controller circuitry of the memory device has access to the file metadata, the file attributes or both;

wherein the one or more commands comprise:
- a first command configured to encode the file metadata, the file attributes or both to a register;
- a second command configured to configured to indicate that the file metadata, the file attributes or both will be provided to the controller circuitry in a third command; and
- the third command configured to update, at the memory device, the encoded file metadata, file attributes or both at the register.

* * * * *